US011693663B2

United States Patent
Miniskar et al.

(10) Patent No.: US 11,693,663 B2
(45) Date of Patent: Jul. 4, 2023

(54) CIRCULAR QUEUE MANAGEMENT WITH SPLIT INDEXES

(71) Applicant: UT-Battelle, LLC, Oak Ridge, TN (US)

(72) Inventors: Narasinga Rao Miniskar, Oak Ridge, TN (US); Frank Y. Liu, Oak Ridge, TN (US); Jeffrey S. Vetter, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 1 day.

(21) Appl. No.: 17/500,851

(22) Filed: Oct. 13, 2021

(65) Prior Publication Data
US 2022/0129275 A1 Apr. 28, 2022

Related U.S. Application Data

(60) Provisional application No. 63/104,603, filed on Oct. 23, 2020.

(51) Int. Cl.
*G06F 9/38* (2018.01)
*G06F 9/54* (2006.01)

(52) U.S. Cl.
CPC .......... *G06F 9/3814* (2013.01); *G06F 9/546* (2013.01)

(58) Field of Classification Search
CPC ........ G06F 9/3814; G06F 9/544; G06F 9/546; G06F 3/0659; G06F 5/08; G06F 5/10; G06F 5/12; G06F 5/14; H04L 2012/5681
See application file for complete search history.

(56) References Cited

U.S. PATENT DOCUMENTS

| | | | | |
|---|---|---|---|---|
| 5,426,756 A * | 6/1995 | Shyi | .......................... | G06F 5/14 711/159 |
| 6,145,061 A | 11/2000 | Garcia et al. | | |
| 6,337,893 B1 * | 1/2002 | Pontius | ..................... | G06F 5/14 377/34 |
| 6,341,302 B1 * | 1/2002 | Celis | ...................... | G06F 9/546 718/100 |
| 6,363,470 B1 | 3/2002 | Laurenti et al. | | |
| 7,089,380 B1 * | 8/2006 | Schober | ................... | G06F 5/12 710/57 |
| 7,802,032 B2 | 9/2010 | Christenson | | |
| 8,656,409 B2 | 2/2014 | Li et al. | | |
| (Continued) | | | | |

OTHER PUBLICATIONS

Khiszinsky, "Lock-Free Data Structures. Yet Another Treatise", Mar. 18, 2015, 17 pages.*

(Continued)

*Primary Examiner* — David J. Huisman
(74) *Attorney, Agent, or Firm* — Klarquist Sparkman, LLP

(57) ABSTRACT

Methods and apparatus for managing circular queues are disclosed. A pointer designates an index position of a particular queue element and contains an additional pointer state, whereby two pointer values (split indexes) can designate the same index position. Front and rear pointers are respectively managed by dequeue and enqueue logic. The front pointer state and rear pointer state distinguish full and empty queue states when both pointers designate the same index position. Asynchronous dequeue and enqueue operations are supported, no lock is required, and no queue entry is wasted. Hardware and software embodiments for numerous applications are disclosed.

16 Claims, 18 Drawing Sheets

(56) References Cited

U.S. PATENT DOCUMENTS

| | | | |
|---|---|---|---|
| 9,069,566 | B1 | 6/2015 | Kumar et al. |
| 9,246,836 | B2 | 1/2016 | Biswas |
| 9,378,059 | B2 | 6/2016 | Huetter et al. |
| 9,448,856 | B2 | 9/2016 | Hopkins |
| 2005/0262314 | A1* | 11/2005 | Oh .................... G06F 5/10 711/154 |
| 2006/0251090 | A1* | 11/2006 | Jones .................. G06F 5/14 370/412 |
| 2007/0276973 | A1* | 11/2007 | Tan .................... G06F 5/14 710/112 |
| 2011/0145835 | A1 | 6/2011 | Rodrigues et al. |
| 2017/0371590 | A1 | 12/2017 | Rankovic et al. |
| 2021/0019071 | A1* | 1/2021 | Chen .................. G06F 1/04 |

OTHER PUBLICATIONS

Ruiz et al., "Non-Blocking Synchronization Between Real-Time and Non-Real-Time Applications", Aug. 2020, pp. 147618-147634.*

Giacomoni et al., "FastForward for Efficient Pipeline Parallelism: A Cache-Optimized Concurrent Lock-Free Queue", PPoPP '08: Proceedings of the 13th ACM SIGPLAN Symposium on Principles and practice of parallel programming, pp. 43-52 (Feb. 2008).

Jablin et al., "Liberty Queues for EPIC Architechtures", available from: https://liberty.cs.princeton.edu/Publications/epic10_queues.pdf, pp. 1-19, also published as Jablin et al., "Liberty queues for epic architectures," in Proceedings of the Eighth Workshop on Explicitly Parallel Instruction Computer Architectures and Compiler Technology (EPIC-8) (Apr. 2010).

Lamport, "Specifying Concurrent Program Modules", ACM Transactions on Programming Languages and Systems, vol. 5, No. 2, pp. 190-222 (Apr. 1983).

Lee et al., "A Lock-Free, Cache-Efficient Multi-Core Synchronization Mechanism for Line-Rate Network Traffic Monitoring", 2010 IEEE International Symposium on Parallel & Distributed Processing (IPDPS), pp. 1-12 (Apr. 2010).

Miniskar et al., "A Memory Efficient Lock-Free Circular Queue", 2021 IEEE International Symposium on Circuits and Systems (ISCAS), 5 pages (Apr. 2021).

Wang et al., "B-Queue: Efficient and Practical Queuing for Fast Core-to-Core Communication", available from http://citeseerx.ist.psu.edu/viewdoc/download?doi=10.1.1.459.1379&rep=rep1&type=pdf, pp. 1-23 (Aug. 2012), also published as Wang et al., "B-Queue: Efficient and Practical Queuing for Fast Core-to-Core Communication", Intl J Parallel Prog, vol. 41, pp. 137-159 (Aug. 2012).

Wang et al., "EQueue: Elastic Lock-Free FIFO Queue for Core-to-Core Communication on Multi-Core Processors", IEEE Access, vol. 8, pp. 98729-98741 (May 2020).

* cited by examiner

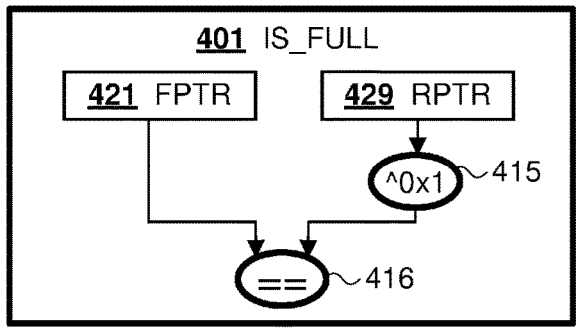 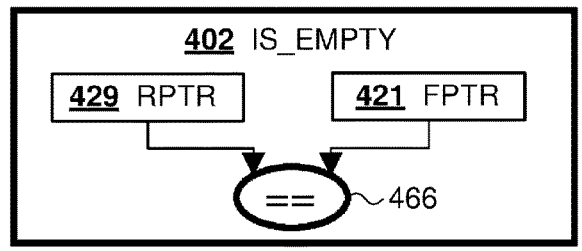
*FIG. 4A*  *FIG. 4B*
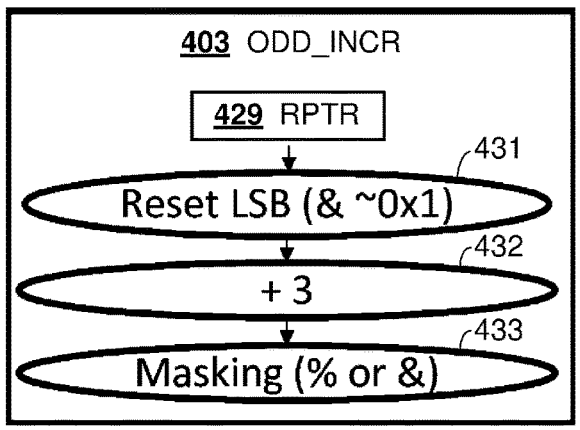 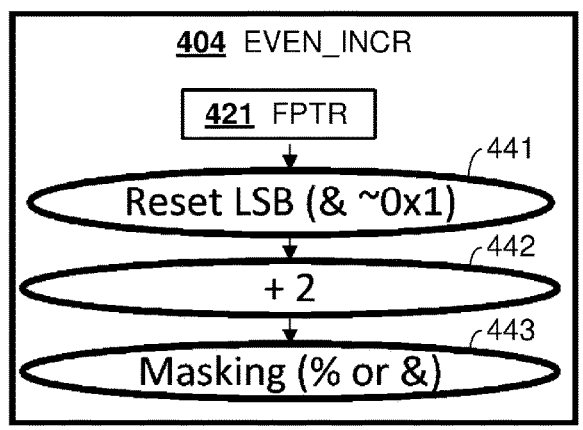
*FIG. 4C*  *FIG. 4D*
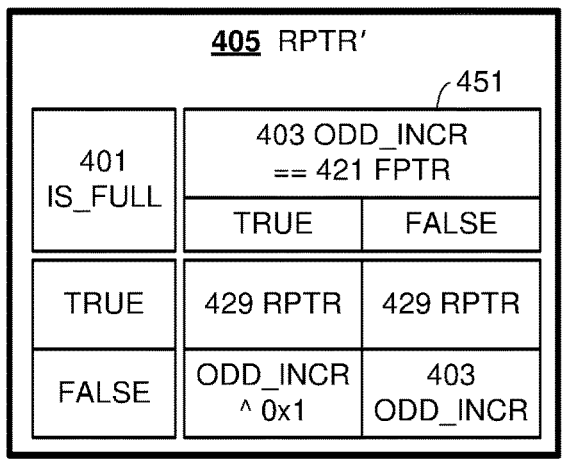 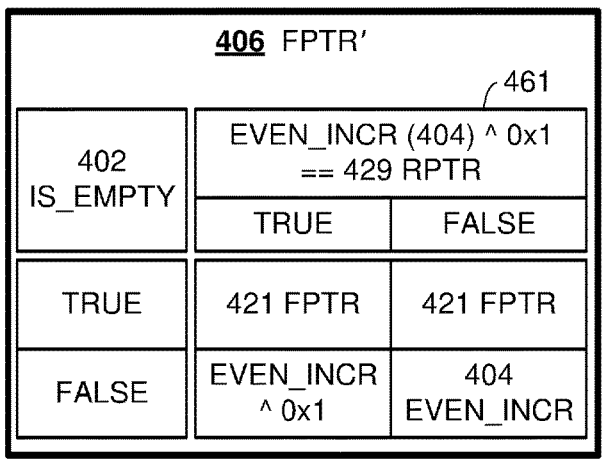
*FIG. 4E*  *FIG. 4F*

US 11,693,663 B2

CIRCULAR QUEUE MANAGEMENT WITH SPLIT INDEXES

CROSS REFERENCE TO RELATED APPLICATIONS

This application claims the benefit of U.S. Provisional Application No. 63/104,603, filed Oct. 23, 2020 which is incorporated herein by reference in its entirety.

ACKNOWLEDGMENT OF GOVERNMENT SUPPORT

This invention was made with government support under Contract No. DE-AC05-00OR22725 awarded by the U.S. Department of Energy. The government has certain rights in the invention.

BACKGROUND

Circular queues are widely used. A circular queue can be managed with pointers designating which elements of the queue are next in line to be written (an enqueue operation) or read (a dequeue operation). However, a queue with N locations has N+1 occupancy values (from 0 to N, inclusive), and the element indexes by themselves can be insufficient to distinguish all states of the queue. Conventional techniques for managing queues suffer from assorted drawbacks. In one approach, separate flags can be maintained for empty and full states, e.g. an enqueue process can set a "full" flag when the occupancy reaches N, and a dequeue process can clear the full flag when an entry is dequeued from a full queue. However, because both enqueue and dequeue processes can modify the full flag, a lock between the processes can be required, slowing down queue performance, by up to 50×. In another approach, NULL entries can be used to identify vacant queue elements. However, this can incur substantial overhead, for writing and verifying NULL entries. Furthermore, limiting a W-bit element to $2^W-1$ valid entries, instead of the full space of $2^W$ entries, can cause problems in some applications. In a further approach, a Lamport queue can reserve a vacant element ahead of the front of the queue. Thus, a Lamport queue having N storage locations can provide a maximum occupancy of N−1, leading to an inefficient utilization of memory space, which can be particularly significant in applications requiring kilobyte or larger queue elements on-chip. Accordingly, there remains a need for improved technologies to manage circular queues.

SUMMARY

In brief, the disclosed technologies implement front and rear queue pointers with split index values to distinguish full and empty queue states.

In one aspect, the disclosed technologies can be implemented as a system for managing a lock free circular queue. The queue has a predetermined number of elements and each element has a predetermined size. The elements are indexed using respective element indexes. Each element index is split into a respective pair of split indexes. A rear pointer of the queue is updated when an enqueue operation is performed, and a front pointer of the queue is updated when a dequeue operation is performed. The system includes a rear-pointer controller and a front-pointer controller. The rear-pointer controller is configured to determine whether a requested enqueue operation would fill the queue and, if so, set the rear pointer to a given rear split index and, otherwise, set the rear pointer to a default rear split index. The given rear split index, in conjunction with a current value of the front pointer, indicates that the queue is full. The front-pointer is controller configured to evaluate whether a requested dequeue operation would empty the queue and, if so, set the front pointer to a given front split index and, otherwise, set the front pointer to a default front split index. The given front split index indicates, in conjunction with a current value of the rear pointer, that the queue is empty.

In some examples, the given rear split index can be distinct from a split index of the current value of the front pointer, while the given front split index can equal a split index of the current value of the rear pointer. In other examples, the given rear split index can equal the split index of the current value of the front pointer, while the given front split index can be distinct from the split index of the current value of the rear pointer.

In further examples, the split indexes of any of the elements can be denoted even and odd. The default rear split index can be the odd split index of a second element of the queue following a first element of the queue targeted by the requested enqueue operation. The default front split index can be the even split index of a fourth element of the queue following a third element of the queue targeted by the requested dequeue operation.

In additional examples, the system can include a data processing apparatus and memory storing instructions. When executed by the data processing apparatus, the instructions can cause the system to implement the rear-pointer controller and the front-pointer controller. In alternative examples, the system can include first electronic circuitry hard-wired as the rear-pointer controller and second electronic circuitry hard-wired as the front-pointer controller.

In certain examples, the system can also include a rear-pointer memory element, a demultiplexer, a front-pointer memory element, and a multiplexer. The rear-pointer memory element can be coupled to provide the current value of the rear pointer to the rear-pointer controller and to the front-pointer controller, and can be further coupled to receive an updated value of the rear pointer from the rear-pointer controller. The demultiplexer can be configured to receive the current value of the rear pointer and to forward a data entry to an element of the queue designated by the current value of the rear pointer, in response to a write enable signal received from the rear-pointer controller. The front-pointer memory element can be coupled to provide the current value of the front pointer to the front-pointer controller and to the rear-pointer controller, and can be further coupled to receive an updated value of the front pointer from the front-pointer controller. The multiplexer can be configured to receive the current value of the front pointer and to forward a data entry, from an element of the queue designated by the current value of the front pointer, in response to a read enable signal received from the front-pointer controller. The system can also include additional memory elements configured to store the queue.

In some examples, the rear-pointer controller can be configured to operate in an enqueue clock domain, and the front-pointer controller can be configured to operate in a dequeue clock domain. The enqueue and dequeue clock domains can be asynchronous relative to each other.

In further examples, an above-mentioned system and its queue can be incorporated in a CPU module. The queue can be an instruction buffer. An above-mentioned system and its queue can be incorporated in a network router or a network switch. The queue can be a packet buffer. An above-mentioned system and its queue can be incorporated in a media streaming apparatus. The queue can be a media stream buffer. An above-mentioned system can be incorporated in a load balancer configured to distribute a stream of tasks among a plurality of processors. Descriptors of the tasks can be stored in respective elements of the queue.

In certain examples, an above-mentioned system and its queue can be incorporated in an integrated circuit, along with a port configured to interface with an external memory device. The external memory device can provide the elements of the queue. The integrated circuit can be a packet processor and the enqueue operation and the dequeue operation can transfer network data packets between the packet processor and the external memory device. The integrated circuit can be a media processor and the enqueue operation and the dequeue operation can transfer media frames between the media processor and the external memory device.

In a second aspect, the disclosed technologies can be implemented as an apparatus operably coupled to a queue having a plurality N of storage locations and an occupancy ranging from zero to N. The apparatus includes circuitry configured to implement a write pointer and a read pointer. The write pointer indicates a first location of the N storage locations and additionally has a selectable write pointer state. The read pointer indicates a second location of the N locations and additionally has a selectable read pointer state. A particular combination of the first location and the second location corresponds to two distinct values of the occupancy. The distinct values are distinguishable according to the write pointer state and the read pointer state. The circuitry is further configured to manage the queue as a circular first-in first-out (FIFO) queue by performing the following operations. Responsive to a write operation on the queue, the write pointer is updated, which includes setting the write pointer state to indicate the occupancy. Responsive to a read operation on the queue, the read pointer is updated, which includes setting the read pointer state to indicate the occupancy.

In certain examples, for equal values of the first and second locations, a first value of the write pointer state can be defined, based on a current value of the read pointer state, to indicate that the occupancy is N. A second value of the read pointer state can be defined, based on a current value of the write pointer state, to indicate that the occupancy is zero. Setting the write pointer state can include setting the write pointer state to the first value. Setting the read pointer state can include setting the read pointer state to the second value.

In some examples, the first value can equal the current value of the read pointer state, and the second value can be distinct from the current value of the write pointer state. In other examples, the first value can be distinct from the current value of the read pointer state, and the second value can equal the current value of the write pointer state.

In additional examples, the apparatus can include an integrated circuit in which the circuitry is hard-wired to perform the operations. In alternative examples, the apparatus can include one or more hardware processors with memory coupled thereto, and computer-readable media storing instructions. When executed by the one or more hardware processors, the instructions can cause the circuitry to perform the operations of setting the read pointer state and setting the write pointer state.

In another aspect, the disclosed technologies can be realized as a system for implementing a network of processes, including a plurality of cores of one or more processors, with memory coupled thereto. The cores configured to perform the processes concurrently. The system can include one or more of the above-mentioned apparatuses according and their respective queues. The system can be configured to use each of the one or more apparatuses and its respective queue to buffer data communicated between a respective pair of the processes.

In some examples, the processes can include distinct first and second sequential processes, and the system can include at least two of the apparatuses. A first queue can be coupled to transfer data from the first sequential process to the second sequential process. A second queue can be coupled to transfer data from the second sequential process to the first sequential process.

In other examples, the processes can include first, second, and third sequential processes, distinct from each other and parallel to each other; and at least two of the apparatuses. A first queue can be coupled to transfer data from the first sequential process to the second sequential process. A second queue can be coupled to transfer data from the first or second sequential process to the third sequential process, or from the third sequential process to the first or second sequential process. The first, second, and third sequential processes can perform successive stages of image processing in a pipelined image processor, with the second queue transferring data from the second sequential process to the third sequential process. The buffered data can include successive images or successive image macroblocks stored at successive storage locations of the first or second queue. The processes can implement a graph of image processing tasks in a computer vision system.

In additional examples, the queue can be managed as a lock-free queue. The apparatus can incorporate static random-access memory (SRAM) implementing the storage locations of the queue.

In a further aspect, the disclosed technologies can be implemented as one or more computer-readable media storing executable instructions for managing a queue by performing actions mentioned below. The queue includes a plurality of storage elements having respective pairs of split index values, and is managed using front and rear pointers for dequeue and enqueue operations respectively. The front and rear pointers store respective values of the split index values. A full state of the queue is indicated by the rear pointer having a first split index value, which is dependent on a current value of the front pointer. The actions include determining whether a requested enqueue operation would result in the full state of the queue. The actions include setting the rear pointer to the first split index value in case of an affirmative result, and setting the rear pointer to a default rear split index value in case of a negative result.

In some examples, an empty state of the queue can be indicated by the front pointer having a second split index value dependent on a current value of the rear pointer, the actions can also include evaluating whether a requested dequeue operation would result in the empty state of the queue. The actions can include setting the front pointer to the second split index value in case of an affirmative result, and setting the front pointer to a default front split index value in case of a negative result. The instructions can cause the actions of setting the rear pointer to be performed in a first thread, and can cause the actions of setting the front pointer to be performed in a second thread distinct from the first thread.

The foregoing and other objects, features, and advantages of the invention will become more apparent from the following detailed description, which proceeds with reference to the accompanying figures.

BRIEF DESCRIPTION OF THE DRAWINGS

FIG. 4A-4F are diagrams illustrating example implementations of logic components of FIG. 3 according to the disclosed technologies.

DETAILED DESCRIPTION

Introduction

Figure 1:
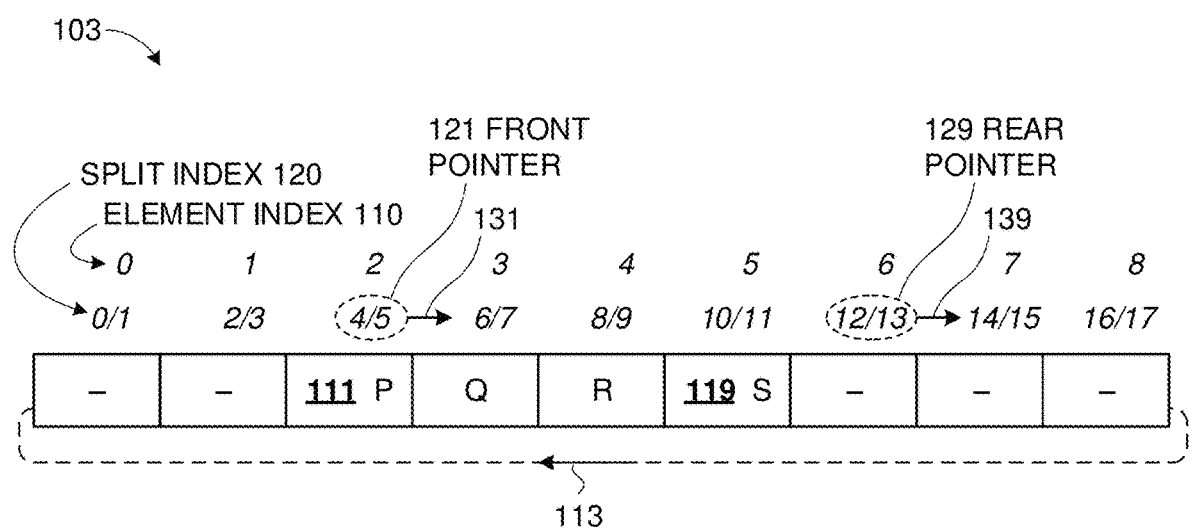
FIG. 1 is a diagram of a circular queue with exemplary split indexes according to the disclosed technologies.

Circular queues are widely used as elastic buffers for data transmitted from sources to sinks. Sources and sinks can variously be devices on a chip, devices connected by a network, or software processes. On-chip applications include instruction buffers for a processor; message passing between threads, cores, tasks, or processors in a parallel processing environment; specialized graphics or image processors; a packet processor in a network appliance; or a stream processor for a media appliance. System level applications include boxed equipment for any of these integrated circuit applications; load balancing for large-scale database, web, or transaction processing applications with multiple servers; or Kahn process networks.

A front pointer can be used to designate a next queue element to be dequeued, and a rear pointer can be used to indicate a next queue element to receive an entry. A problem with naïve queue pointer management is that, for a given front pointer of an N element queue, there are N elements to which the rear pointer can point, but N+1 possible values of occupancy. In some implementations, both front and rear pointers can point to a same element in both empty-queue and full-queue states, and a mechanism can be required in order to distinguish full and empty states.

As described above, conventional approaches can variously suffer from (i) degraded performance if a lock is required between enqueue logic and dequeue logic, (ii) inefficient memory utilization, if maximum occupancy of an N-element queue is limited to N−1, or (iii) performance overhead, if a NULL value is used to designate a vacant element.

The disclosed technologies can solve these problems by incorporating one additional state bit into each of the front pointer and the rear pointer. The front pointer state bit can be set solely by dequeue logic and the rear pointer state bit can be set solely by enqueue logic, and no lock is required. Different combinations of front pointer state bit and rear pointer state bit can distinguish empty and full queue states when both front and rear pointers designate the same queue element. Accordingly, no space is wasted and no special value is needed to designate a vacant element. Enqueue and dequeue logic can operate asynchronously and in parallel. The combination of queue element index and pointer state is dubbed a "split index."

The disclosed technologies can be efficiently implemented in hardware or software, across a wide range of queue lengths and widths. Test results show good performance. These and other advantages of the disclosed technologies will become apparent from the examples described herein.

Terminology

To facilitate review of the various embodiments, the following explanations of terms are provided. Occasionally, and where clear from the context, a term may also be used in a different meaning.

1. Queue Terminology

As used herein, a "queue" is a block of data storage configured for retrieval of stored data items in a defined order. Some queues of interest herein are organized for retrieval of the stored data items in the same order as the data items were stored in the queue, and are termed "first-in first-out" ("FIFO") queues. Generally, a queue can exist alongside metadata for maintaining the state of the queue, and hardware (and sometimes software) logic to perform storage, retrieval, and state maintenance operations for the queue.

Each data item stored in a queue is termed an "entry," and occupies a respective portion of the queue's data storage dubbed a "storage location" or "element" of the queue. Generally, a queue can have two or more storage locations, which can be of a uniform size. The number of storage locations N (N being a positive integer greater than equal to two) in a queue is termed the "length" of the queue. The size of each storage location (which can be denominated as bits or bytes) is termed the "width" of the queue. The number of entries in the queue at any given time is termed the "occupancy" of the queue: for a queue with N storage locations, the occupancy can range from zero (queue is "empty") to N (queue is "full"). A queue can exist without any stored data.

Operations in which an entry is added to a queue are variously dubbed "enqueue," "insert," "store," "write," or related word forms. A storage location not storing a data item is termed "vacant." Generally, a storage location can be freed, and regarded as vacant, upon retrieval of its stored data item. That is, a queue can provide one-time retrieval of stored data items. Thus, operations in which an entry is removed from a queue are variously dubbed "dequeue," "extract," "retrieve," "read," or related word forms.

In examples, an instantaneous state of a queue can have a contiguous range of occupied storage locations, from a "front" of the queue, which can be the storage location containing the oldest stored entry not yet retrieved, through successive storage locations of newer entries, to the storage location ("rear" of the queue) holding the most recently stored entry of the queue. To support ordered data retrieval from a queue, a "front pointer" (or, "read pointer") can be used to designate the front of the queue, which can be a next storage location targeted by a dequeue operation. Conversely, a "rear pointer" (or "write pointer") can be used to designate a next storage location targeted by an enqueue operation, which can be the storage location immediately following the rear of the queue. A front or rear pointer has a memory location (which can be a register) and a value stored in that memory location. A pointer is said to be "updated" when the value stored at the corresponding memory location is changed. A pointer is said to be "implemented" when hardware or software logic is configured to use the corresponding memory location as an indication of the storage location for the next dequeue or enqueue operation on the queue. Hardware or software logic configured to implement or update a front pointer is dubbed "dequeue logic," "front-pointer controller," "read controller," or "read logic." Hardware or software logic configured to implement or update a rear pointer is dubbed "enqueue logic," "rear-pointer controller," "write controller," or "write logic."

A storage location of a queue can have an "index," which is an identifier or address distinguishing that storage location among the multiple storage locations of the queue. Disclosed embodiments utilize a "split index" in which multiple index values can designate a single storage location. To illustrate, a queue with length four can have elements indexed as {0, 1, 2, 3}, and split indexes for these elements can be {0A, 0B} for element 0, {1A, 1B} for element 1, and so forth.

In some examples, a read pointer can be implemented as a combination of an index (e.g. {0,1,2,3}) and a "read pointer state" (e.g. {A, B}). That is, a read pointer state can be a field of a read pointer which distinguishes multiple split index values of the front of the queue. Similarly, a "write pointer state" can distinguish multiple split index values of the next storage location to be written. Alternative split index representations can be used. To illustrate, an index n can be mapped to a split index 2n+{0,1}. Thus, the first storage location of a queue can have index 0, and split index values {0, 1}, while the last storage location can have index 3, and split index values {6, 7} as alternatives to {3A, 3B}. Notations such as {3.0, 3.1} or {0.3, 1.3} can also be used.

A read pointer state being "selectable" means that, at the time of updating the read pointer, hardware or software logic managing the queue can make a selection between multiple split index values for a given storage location.

As used herein, a "circular queue" is a queue having a finite linear sequence of successive storage locations, such that a first of the storage locations logically succeeds a last of the storage location. Thus, the finite linear sequence of storage locations has a logical appearance of an endless circular sequence of storage locations. For queues having power-of-two length (e.g. 2, 4, 8, 16, . . . ), circularity can follow naturally from a binary bit representation of an index—e.g. for a queue of length 4 with a two-bit index representation, incremented index values naturally wrap around (0, 1, 2, 3, 0, 1, 2, . . . ).

As used herein, a "lock" is a hardware or software logic mechanism that prevents two competing processes or circuits from making conflicting accesses to a shared resource. To illustrate, if both enqueue operation logic and dequeue operation logic can write an IsFull flag (e.g. the flag could be written by an enqueue operation and cleared by a dequeue operation), then a lock between enqueue and dequeue operations can prevent a race condition on the IsFull flag. As used herein, a "lock-free queue" is a queue whose control logic (hardware or software) is configured to operate safely without any lock between the enqueue logic and the dequeue logic. The absence of a lock between enqueue logic and dequeue logic does not preclude the presence of locks within enqueue logic or within dequeue logic. For example, multiple upstream processes can issue enqueue requests for a lock-free queue, and a lock can be implemented between the upstream processes, while maintaining an absence of locks between enqueue logic and dequeue logic.

As used herein, the "state" of a queue refers to a set of information sufficient to determine at least the front and rear pointers of a queue, whether the queue is full, and whether the queue is empty. The foregoing list is not limiting, and in some examples, the state of the queue can also include other attributes.

2. General Terminology

As used herein, the unqualified term "data" refers to any digital representation of information.

As used herein, a "buffer" is a block of data storage used for temporary storage of one or more data items. While queues can be used as buffers, buffers need not be queues. In varying examples, a buffer can have a single storage location for a single data item; a buffer with multiple storage locations can support independent retrieval or storage at those storage locations; or invalidation of a buffer entry can be independent of its retrieval, e.g. a buffer entry can be retained after it has been retrieved.

As used herein, a "processor" is an apparatus implemented on one or more integrated circuits and operable to decode and execute a predetermined sequence of program instructions.

As used herein, "logic" (sometimes, "controller") refers to various combinations of hardware and/or software that perform one or more functions for managing a queue. "Hard-wired" logic is implemented fully in electronic circuit devices ("hardware"), wherein incoming signals requesting enqueue or dequeue operations are acted upon autonomously by the circuit devices, without mediation by a processor, to update the queue. Hard-wired logic includes integrated circuit implementations having a fixed gate design, as well as reprogrammable hardware such as an FPGA that can be configured by a bitstream, but excludes logic implemented by a processor executing a masked-ROM (read only memory) program. "Software" logic implementations can have a computer program, executed by a processor, mediate between (i) incoming signals requesting enqueue or dequeue operations and (ii) ensuing operations on the queue or pointers. In some examples, executed instructions of the software program can receive the incoming requests and directly write updates to the queue pointers and read and write queue storage locations. In other examples, executed instructions of the software program can receive the incoming requests and issue responsive signals to a peripheral device of the processor, which in turn can perform the queue operations. Accordingly, the term "logic hardware" (or "circuitry") can variously refer to the circuit devices of a hard-wired implementation, to the processor circuits of a software implementation, or to the peripheral circuits of another software implementation.

As used herein, the term "software" refers to computer-executable programs, instructions, or associated data structures. Software can be in active or quiescent states. In an active state, software can be loaded into memory, or can be undergoing execution by one or more processors. In a quiescent state, software can be stored on computer-readable media, awaiting transmission or execution.

As described herein, examples of the disclosed technologies can be implemented as integrated circuits, or as boxed equipment. As used herein, "boxed" equipment refers to apparatus combining one or more integrated circuits on a chassis or in a box, ready for use without further assembly, commonly but not necessarily housed in a box. Boxed equipment can be ready for use when provided with a power supply and, in some instances, input or output signals and, in further instances, configuration of the equipment, but without further assembly. In this respect boxed equipment differs from most integrated circuits.

3. Applications of the Disclosed Technology

As used herein, a "pipeline" is a serial arrangement of hardware or software functional blocks operating in parallel, such that data units flow from one functional block to the next (as if along a pipe). To illustrate, data units 1, 2, 3 can be successively fed to a pipeline of blocks A, B, C. Data unit 1 is processed first by block A, the results from block A are forwarded to block B, and the results from block B are forwarded to block C. When block C is operating on data unit 1, block B can operate on data unit 2, and block A can operate on data unit 3. Disclosed technologies can be used to manage pointers to a queue of data units between successive stages of a pipeline.

As used herein, "central processing unit" ("CPU") refers to a module in a computer that can receive and execute a stream of program instructions. A CPU module can refer to an integrated circuit device or an intellectual property block in a semiconductor device library. A CPU can decouple instruction processing into fetch, decode, and execution operations, which can be pipelined, and a queue can be used as a buffer between pipeline stages. An "instruction buffer" can store fetched or decoded instructions as they await a next stage of an instruction pipeline. Disclosed technologies can be used to manage pointers to an instruction buffer. Queues can also be implemented between a processor core and on-chip peripheral blocks such as communication port controllers, memory controllers, or storage controllers, and can also be managed with disclosed technologies.

As used herein, "network router" and "network switch" refer to multi-port devices in a network which selectively forward a data packet received on one port to another port. A "network" is a group of computing or communication devices coupled to transfer data among the devices. A "data packet" is a finite data transmission forwarded as a whole. Communication on some networks can be organized according to the Open Systems Interconnection (OSI) model of the International Standards Organization (ISO). As used herein, a data packet is not restricted to packets of OSI layer 3 (network layer), but can be at any OSI layer. Generally, a network switch can forward a data packet to its immediately connected devices, whereas a network router can forward a data packet along a path which can extend beyond its immediately connected devices, e.g. through a switch. A network router or switch can experience competition for resources, e.g. two packets can be received on distinct ports, with one waiting to be handled by a packet processor in the router or switch; or one packet to be transmitted out a given port may have to wait for that port to be available. Accordingly, it can be desirable to store data packets in a buffer, dubbed a "packet buffer," until a necessary resource becomes available. Disclosed technologies can be used to manage pointers to a packet buffer.

As used herein, "media stream" refers to audio, video, or multimedia (which can include television, webcast, conference, telephony, or other streaming content) which is transmitted as a continuous stream of digital packets called "media frames". "Media streaming apparatus" refers to equipment that can generate, distribute, record, receive, or reproduce a media stream. Media streaming apparatus can include video streaming servers; distribution or relay nodes in a content distribution network; conference bridges; video recorders, cameras, televisions, or telephones. A "media stream buffer" (or "frame buffer") can buffer frames between a source and a sink of a media stream. The source and sink can be internal or external to the media streaming apparatus, in any combination. Disclosed technologies can be used to manage pointers to a media stream buffer.

As used herein, "computer vision system" refers to equipment, integrated circuit devices, or software that performs object recognition from digital images or video. In some implementations, a computer vision system can include software or hardware blocks performing respective tasks which can be organized as a graph.

As used herein, "network of processes" refers to parallel computing processes organized as nodes of a graph, with directed communication between select pairs or groups of the processes. Disclosed technologies can be used to manage pointers to a queue of messages or other data communicated between a pair of group of the processes. Some example networks of processes are Kahn process networks (KPN), but this is not a requirement and disclosed technologies can also be used for other computing networks. A "sequential process" is a process performing a sequence of operations. Two or more processes being performed concurrently, e.g. by respective cores or respective threads, are "parallel processes". Thus, N parallel sequential processes are N sequential processes being performed concurrently.

As used herein, "pipelined image processor" refers to equipment or integrated circuit devices that process still or video images. In some implementations, a pipelined image processor can include software or hardware blocks performing successive stages of image processing. In a camera, some common stages can include dead pixel removal, dark floor subtraction, noise reduction, exposure adjustment, white balance, interpolation, lens shading, color correction, gamma scaling, or edge enhancement. Disclosed technologies can be used to manage pointers to a queue of images or macroblocks between successive stages. Some image processing or computer vision applications can conform to the OpenVX standard.

As used herein, a "load balancer" is a specialized computing device in a data communication network that serves as a gateway between sources of tasks and multiple servers that can perform the tasks. A load balancer can monitor utilization or health of the servers and distribute incoming tasks equitably between the servers. A "task" is a discrete unit of computing work: non-limiting examples can include a database request, a search request, a web transaction, or another computing task. A task is defined by a "descriptor" which can specify what computing work is to be performed and, optionally, the data on which the work is to be performed, or a disposition for results of the work. A load balancer can be used in an environment where tasks are received on a continual basis, the flow of incoming tasks being dubbed a "task stream." Disclosed technologies can be used to manage pointers to a queue of task descriptors.

Queue properties can vary widely between applications. The disclosed technologies are not limited in supported lengths or widths, and can support all lengths from 2 to 1,000,000 or even more, and all widths from a single bit to 1 GB or even more. Common queue lengths are 2-4 for full images, 8-16 for packet buffers, 16-32 for instruction buffers, and up to 100, 1,000, or even more for a macroblock buffer. Queue widths can also vary considerably. Instruction buffers can often be 1 to 8 bytes wide, but can be wider in e.g. very long instruction word (VLIW) architectures. Packet buffers and media frame buffers can often be 1-10 kB wide, but can be narrower (e.g. less than 100 bytes for some telephony applications) or wider. One entry in an image processing buffer can range from tens of bytes for an 8×8 macroblock to hundreds of megabytes for a complete high resolution image.

Example Circular Queue

FIG. 1 is a diagram of a circular queue with split indexes. Queue 103 has nine elements with indexes 110 (0 through 8) as shown above the respective elements. As illustrated, four elements (111 through 119; index 2 through 5) store respective entries "P", "Q", "R", "S". Location 111 is the front of queue 103 and stores the oldest of the depicted entries. Location 119 is the rear of queue 103 and stores the youngest of the depicted entries.

Each index 110 can be mapped to two split index values. In the illustration, the split index value is formed as n→2n+ {0, 1} for index n. Thus, element 111 with index 2 can have two split index values {4, 5} as shown. Accordingly, front pointer 129 can be set to 4 or 5 for the illustrated case. Correspondingly, rear pointer 129 can be set to the location behind the rear of queue 103. This next-to-be-written location has index 6, and rear pointer 129 can be set to either 12 or 13 as shown.

As dequeue operations are performed, front pointer 121 can advance in the direction shown by arrow 131. As enqueue operations are performed, rear pointer 129 can advance in the direction shown by arrow 139. Neither pointer 121, 129 can go past the other. Both pointers 121, 129 can wrap around from index 8 to index 0 at the appropriate time, as indicated by arrow 113.

To illustrate lock-free operation of queue 103, consider for purpose of illustration that the front pointer split index value is 4, and that five successive enqueues are performed without any dequeue. Four enqueue operations can advance the rear pointer to index 1, while the front pointer remains unchanged at split index 4. For the illustrated example, front and rear pointers having same split index can denote an empty queue, while complementary front and rear pointers (i.e. indexes are same, but split indexes or pointer states are different) can denote a full queue. Therefore, upon the fifth enqueue, the enqueue logic can update the rear pointer to 5, so that front pointer=4 and rear pointer=5 (compactly denoted ⟨4 5⟩) indicates a full queue. Had the front pointer split index value been 5, then the enqueue logic could update the rear pointer to the complementary value (4) upon the fifth enqueue, as ⟨5 4⟩ also denotes a full queue. The enqueue logic operation is safe in that an dequeue operation occurring during the fifth enqueue operation can move the front pointer to the next element (index=3, split index either 6 or 7), which correctly denotes not-full regardless of whether the front pointer updates to 6 or 7.

For dequeuing operations, consider for purpose of illustration that the rear split index value is 13, and that four successive dequeue operations are performed without any enqueue. After three dequeue operations, the front pointer can advance to index 5, while the rear pointer stays at split index 13. On the fourth dequeue operation, the dequeue logic can select between split index values 12, 13, and can select front pointer=13 so that front and rear pointers are set to the same split index, denoting an empty queue as desired. Conversely, if the rear split index value had been 12, the dequeue logic could select 12 on the fourth dequeue operation, which also denotes an empty queue. As for enqueues, this dequeue logic operation is safe, in that an enqueue operation occurring during the fourth dequeue operation can move the rear pointer to the next element (index=7, split index either 14 or 15), which denotes not-empty regardless of whether the rear pointer updates to 14 or 15.

Example Sequence Diagram

Figure 2:
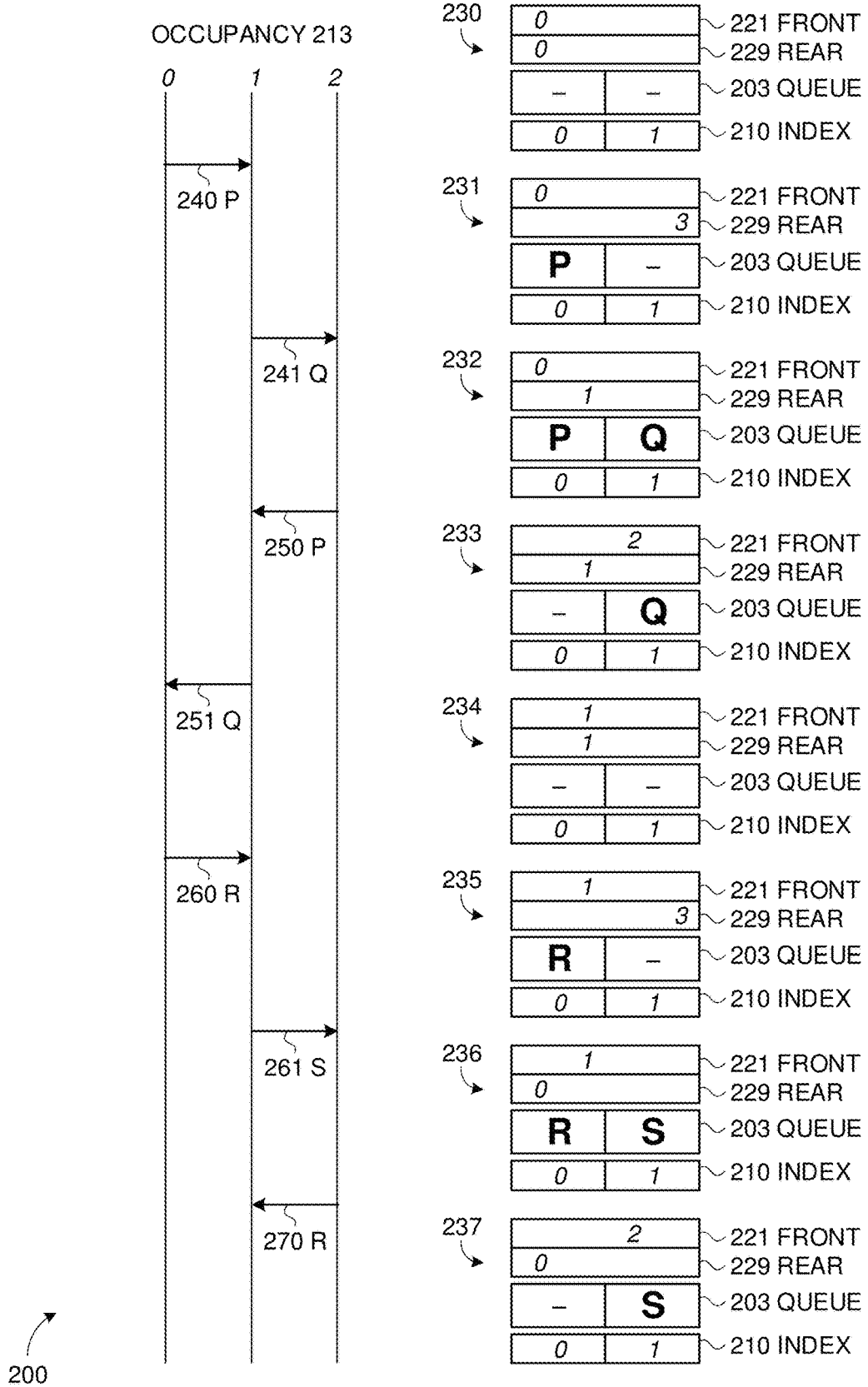
FIG. 2 is a sequence diagram illustrating operation of an example of the disclosed technologies.

FIG. 2 is a sequence diagram 200 illustrating operation of an example of the disclosed technologies. In this illustration, a sequence of enqueue and dequeue operations are performed on a two-element queue 203. Queue 203 and its pointers 221, 229 evolve through successive states 230-237. Occupancy 213 of the queue varies between 0 and 2. In this example, the least significant bit (LSB) of a pointer distinguishes two split index values for a given element index. Front pointer 221 defaults to an even split index, while rear pointer 229 defaults to an odd split index. Complementary pointers denote a full queue while equal pointers denote an empty queue. Time proceeds downward in FIG. 2.

Initially, queue 203 is in an empty state 230. The two elements of queue 203, with index positions 210 {0, 1} are both vacant, as indicated by dashes "-" in the respective cells of queue 203. In initial state 230, both front and rear pointers 221, 229 are zero as shown. In the present example, equal front and rear pointers 221, 229 denote an empty queue.

Enqueue operation 240 stores an entry "P" in queue 203, at index position 0 as indicated by rear pointer 229 of state 230. The resulting state 231 is shown with entry "P" in element 0. Rear pointer 229 can be advanced to its next default split index value 3, which is the odd split index value for index position 1. Front pointer 229 is unchanged.

Another enqueue operation 241 stores an entry "Q", at index position 1 as indicated by rear pointer 229 of state 231. The resulting state 232 is shown with entry "Q" in element 1, in addition to the earlier entry "P". Rear pointer 229 can be advanced to its next default split index value 1, which is the odd split index value for index position 0. The complementary pointers ⟨0, 1⟩ correctly indicate the full state 232, as distinguished from equal pointers ⟨0, 0⟩ of initial state 230. As with all enqueue operations, front pointer 229 remains unchanged.

The next operation 250 retrieves an entry ("P") from the index position 0 pointed to by front pointer 221 of state 232. The resulting state 233 is shown with index position 0 of queue 203 vacated. Front pointer 221 can be advanced to its next default split index value 2, which is the even split index value for index position 1. Pointers ⟨2, 1⟩ are neither equal nor complementary, indicating a state that is neither empty nor full. Rear pointer 229 remains unchanged, as is the case for all dequeue operations.

Another dequeue operation 251 retrieves the entry "Q" from index position 1 pointed to by front pointer 221 of state 233. The resulting state 234 is shown with index position 1 vacated, leaving queue 203 empty. Front pointer 221 can be advanced to a split index value corresponding to next index position 0. Because queue 203 is empty, front pointer 221 can be set to 1, to match rear pointer 229, instead of the default front pointer value 0. Pointers ⟨1, 1⟩ reflect empty state 234. Rear pointer 229 is unchanged.

An enqueue operation 260 stores an entry "R" at the next enqueue location, which is index 0 as pointed to by rear pointer 229 of state 234. As shown in resulting state 235, rear pointer 229 can be advanced to its next default value 3, while front pointer 221 is unchanged.

Another enqueue operation 261 stores an entry "S" at the next enqueue location, now index 1. The resulting state 236 is shown with both positions of queue 203 occupied. Rear pointer 229 can be advanced to a split index value corresponding to next index position 0. Because queue 203 is full, rear pointer 229 can be set to 0, complementary to front pointer 221, instead of the default rear pointer value 1. Pointers ⟨1, 0⟩ reflect full state 236. Front pointer 221 is unchanged.

Then, dequeue operation 270 retrieves an entry ("R") from index position 0 pointed to by front pointer 221 of state 236. The resulting state 237 is shown with index position 0 of queue 203 vacated. Front pointer 221 can be advanced to its next default split index value 2. Pointers ⟨2, 0⟩ are neither equal nor complementary, indicating a state that is neither empty nor full. Rear pointer 229 remains unchanged.

The principles illustrated in FIG. 2 can be applied to other sequences of enqueue and dequeue operations, with varying representations of split indexes or empty and full states. Although FIG. 2 has been illustrated with a two-element queue, the illustrated principles are equally applicable to any queue length or element width. An enqueue request on a full queue or a dequeue request on an empty queue are not illustrated. Such requests cannot be fulfilled and can be rejected as described herein.

Example Queue Management Logic

Figure 3:
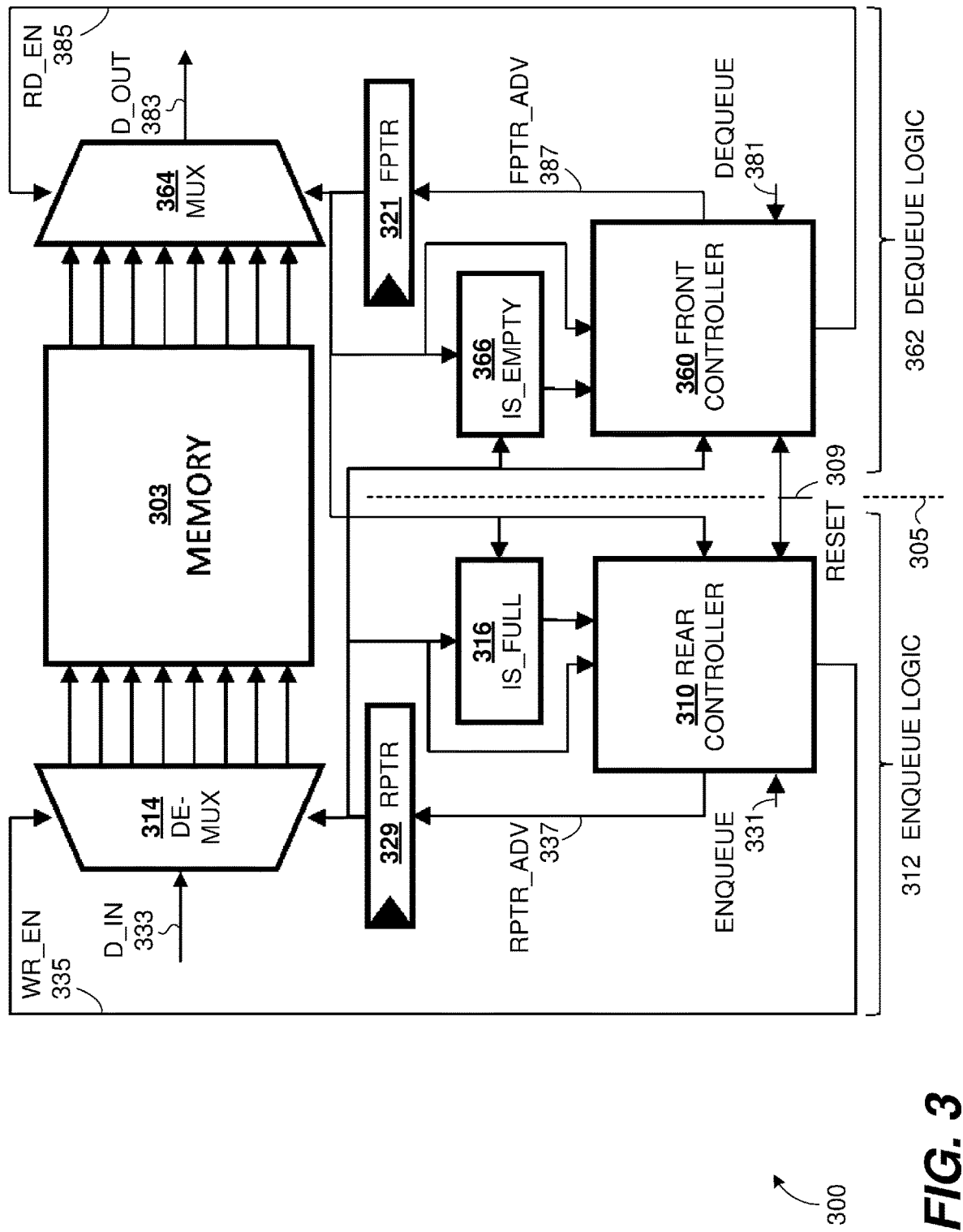
FIG. 3 is a block diagram of first example logic managing a circular queue according to the disclosed technologies.

FIG. 3 is a block diagram 300 of first example logic managing a circular queue. Memory 303 contains eight storage locations of the illustrated queue. Enqueue logic 312 is shown to the left of line 305 and dequeue logic 362 is shown to the right of line 335. Memory 303 is not part of either enqueue logic 312 or dequeue logic 362. Registers 329, 321 store values of the rear and front pointers respectively.

Enqueue logic 312 can receive an enqueue request signal 331 on a same clock cycle as input data D_IN 333 is presented to demultiplexer 314. Rear controller can receive an indication whether queue 303 is full from block 316 (IS_FULL). If IS_FULL 316 is asserted, then no enqueue operation is performed and, in some examples, an error signal can be generated (not shown). Otherwise, with IS_FULL 316 unasserted, rear controller 310 can assert write enable WR_EN 335, causing data D_IN 333 to be written to a particular storage location of queue 303 pointed to by rear pointer 329. Additionally, rear controller can use the present values of rear and front pointers (RPTR, FPTR) from registers 329, 321 to determine an updated value of rear pointer which can be written to read pointer register 329 via rear pointer advance signal RPTR_ADV 337.

Dequeue logic 362 can operate in a similar fashion, receiving dequeue request signal 381 and delivering output data D_OUT 383 from multiplexer 364. Front controller 360 can receive an indication whether queue 303 is empty from block 366 (IS_EMPTY). If IS_EMPTY 366 is asserted, then no dequeue operation is performed and, in some examples, an error signal can be generated (not shown). Otherwise, with IS_EMPTY 366 unasserted, front controller 360 can assert read enable signal RD_EN 385, causing data D_OUT 383 to be read from a particular storage location of queue 303 pointed to by front pointer 321. Additionally, read controller can use the present values of rear and front pointers (RPTR, FPTR) from registers 329, 321 to determine an updated front pointer value which can be written to front pointer register 321 via front pointer advance signal FPTR_ADV 387.

Thus, enqueue logic 312 updates rear pointer RPTR 329 but does not change the value of front pointer FPTR 321, while dequeue logic 362 updates front pointer FPTR 321 but does not change the value of rear pointer RPTR 329. Accordingly, no lock is needed between enqueue logic 312 and dequeue logic 362, and queue 303 can be managed as a lock-free queue.

In some examples enqueue logic 312 and dequeue logic 362 operate synchronously in different clock domains. That is, an enqueue-side clock and a dequeue-side clock signal can be asynchronous with respect to each other. In such cases, dashed line 305 can separate the enqueue and dequeue clock domains. Because the IS_FULL 316 signal is only required by rear controller 310, the IS_FULL 316 circuitry can be clocked by an enqueue-side clock. Likewise, IS_EMPTY 366 signal is only required by front controller 360 and can be clocked by a dequeue-side clock.

Reset signal 309 can reset both rear controller 310 and front controller 360. In examples, upon reset both front and rear pointer values FPTR, RPTR are set to a same first index position of queue 303, with split indexes set to indicate that queue 303 is empty. FIG. 3 depicts an asynchronous reset signal 309, but this is not a requirement and, in other examples, synchronous resets clocked in the respective clock domains can be used.

Example Logic Components

FIGS. 4A-4F are diagrams 401-406 illustrating example implementations of logic components of FIG. 3 according to the disclosed technologies. These logic implementations are depicted for an example where (i) an index n is mapped to split indexes 2n+{0,1}, (ii) equal split indexes denote an empty queue and complementary split indexes denote a full queue, (iii) default split index values are even for a front pointer and odd for a rear pointer. Variations of FIGS. 4A-4F can be implemented for other examples of the disclosed technologies. As described, FIGS. 4A-4F cover queues of arbitrary length although, as described, some logic simplification applies where the queue length is a power of two.

The logic components of FIGS. 4A-4F are described in terms of a few basic operations, including (a) "==" a two-input logical equality test, which returns True if both inputs are arithmetically equal, (b) "^" a bitwise exclusive or (XOR) operation, (c) "&" a bitwise AND operation, (d) "+" addition, e.g. +2 or +3 to add two or three to an input value, (e) "%" an arithmetic modulo operation, e.g. x % N returns the remainder when integer x is divided by integer N. These operations can be implemented in software by software operations such as logical-AND, logical-OR, logical-NOT; if-then-else statements; base-plus-offset table lookup; or other elementary software operations. The operations can be implemented in hard-wired circuitry by logic gates (e.g. AND, XOR, NOT)—an if (A) then (B) else (C) function can be implemented in gates as (A & B)|(~A & C); by a demultiplexer circuit to decode an index into a table; or other elementary circuit blocks.

FIG. 4A describes an IsFull logic implementation 401 similar to block 316 of FIG. 3. For the illustrated example, the queue is full if the front pointer and rear pointer are complementary, that is both have the same index and opposite pointer states. At block 415, an XOR operation between the current rear pointer RPTR 429 and 0x1 (using hexadecimal notation) retains the index value of RPTR 429 and complements the rear pointer state. Then the equality test at block 416 evaluates to True if FPTR 421 and RPTR 429 are complementary, indicating that the queue is full, and False otherwise.

FIG. 4B describes an IsEmpty logic implementation 402 similar to block 366. As shown, rear pointer value 429 and front pointer value 421 are compared at gate 466. If the pointer values 429, 421 are equal, then the IsEmpty output is True, otherwise the IsEmpty output is False.

FIG. 4C describes an odd increment ("ODD INCR") operation that can be used by rear controller 310 to calculate a default value for an updated rear pointer split index value. At process block 431, the least significant bit of a current value of rear pointer split index 429 can be reset to 0. At process block 432, three can be added to the result of block 431, and at block 433, the result can be circularly wrapped around the end of the queue. For the example of FIG. 1, a rear pointer starting value 13 of rear pointer 121 can be updated 13→12→15→15 by blocks 431-433. Alternatively, a starting value of 12 can be updated 12→12→15→15 to arrive at the same updated rear pointer value. In general, block 443 can use the modulo operation to wrap around the end of an instant queue. Overall, diagram 403 can implement a function R3=((RPTR & (~0x1))+3) % N for a queue of length N, with RPTR being the current rear pointer value 429 and ~0x1 being a binary word having a width same as the binary representation of the split index, a zero at the least significant bit (LSB) position, and a one at all other bit positions. For N=$2^L$, where L is a positive integer, diagram 403 can implemented using a mask for the modulo function. In such case, R3=((RPTR & (~0x1))+3) & (N−1).

FIG. 4D describes an even increment ("EVEN INCR") operation that can be used by front controller 360 to calculate a default value for an updated rear pointer split value. The operations of process blocks 441-443 operate on a current value of front pointer split index 421 and are similar to those of blocks 431-433, except that block 442 adds two to the output of block 441. Overall, diagram 404 can implement functions R3=((RPTR & (~0x1))+2) % N for a general case, or R3=((RPTR & (~0x1))+2) & (N−1) when N is a power of two.

FIG. 4E describes rear pointer logic in the form of table 405, with the following inputs: front and rear pointer values 421, 429; outputs IS_FULL 401 and ODD_INCR 403 of FIG. 4A and FIG. 4C respectively. The output of table 405 is an updated rear pointer value RPTR'. If IS_FULL 401 is True, then no enqueue can be performed, and the rear pointer remains unchanged as RPTR'=RPTR 429. Else, if ODD_INCR 403 equals FPTR 421, as tested at block 451, then the queue will be full after the enqueue operation. However, setting RPTR' equal to FPTR 421 could indicate an empty queue. Therefore, to correctly indicate that the queue is full, the updated value can be set to complementary value RPTR'=ODD_INCR ∧ 0x1 (which is the same as FPTR^0x1). Finally, if ODD_INCR 401 is not equal to FPTR 421, then the bottom right box of table 405 sets updated RPTR'=ODD_INCR 403, which operates correctly whether the updated queue is full (same index for updated RPTR' and FPTR 421) or not (different index for updated RPTR' and FPTR 421).

FIG. 4F describes front pointer logic in the form of table 406, with the following inputs: front and rear pointer values 421, 429; outputs IS_EMPTY 402 and EVEN_INCR 404 of FIG. 4B and FIG. 4D respectively. The output of table 406 is an updated front pointer value FPTR'. If IS_EMPTY 402 is True, then no dequeue can be performed, and the front pointer remains unchanged as FPTR'=FPTR 421. Else, if EVEN_INCR^0x1 equals RPTR 429, as tested at block 461, then EVEN_INCR 404 is complementary to RPTR 429 and the queue will be empty after the dequeue operation. However, setting FPTR' to be complementary to RPTR 429 could indicate a full queue. Therefore, to correctly indicate that the queue is empty, the updated value can be set to FPTR'=EVEN_INCR ∧ 0x1 (which is the same as RPTR). Finally, if EVEN_INCR 404 is not complementary to RPTR 429, then the bottom right box of table 406 sets updated FPTR'=EVEN_INCR 404, which operates correctly whether the updated queue is empty (same index for updated FPTR' and RPTR 429) or not (different index for updated FPTR' and RPTR 429).

The logic depicted in tables 405-406 can be implemented using table look-up in either hardware or software, with row and column indices as shown. Alternatively, the logic of tables 405-406 can be implemented as if-then-else clauses in software, or corresponding gate logic in hardware.

The logic depicted in FIGS. 4A-4F is merely exemplary. For each of FIGS. 4A-4F, alternative logic can be used. Furthermore, similar logic can be used for other split index representations.

Example Methods

Figure 5B:
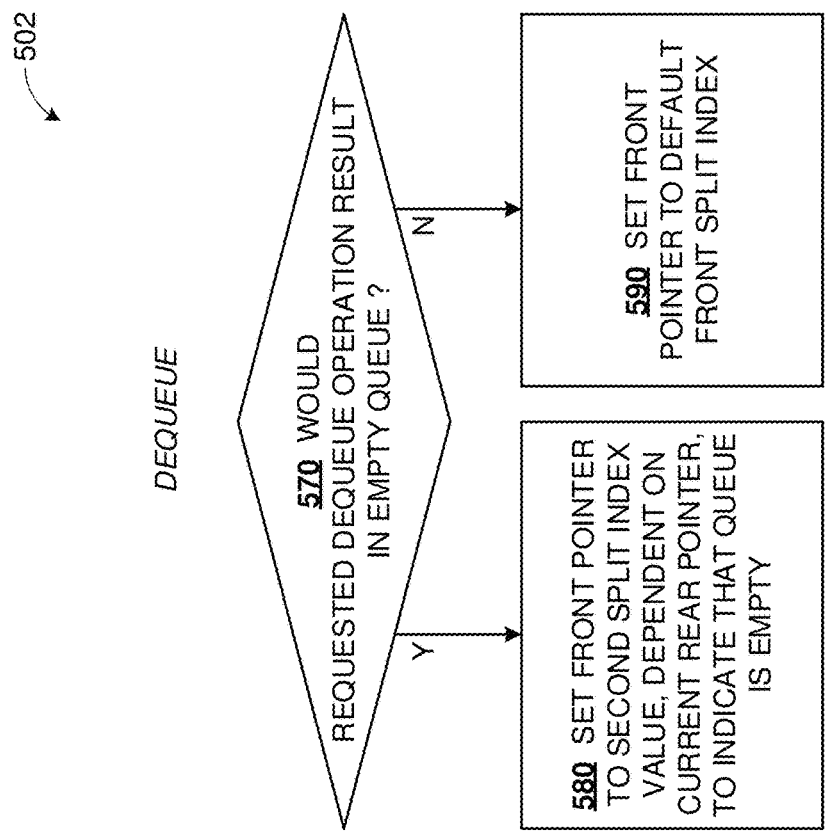
FIGS. 5A-5B are flowcharts of exemplary methods according to the disclosed technologies.
Figure 5A:
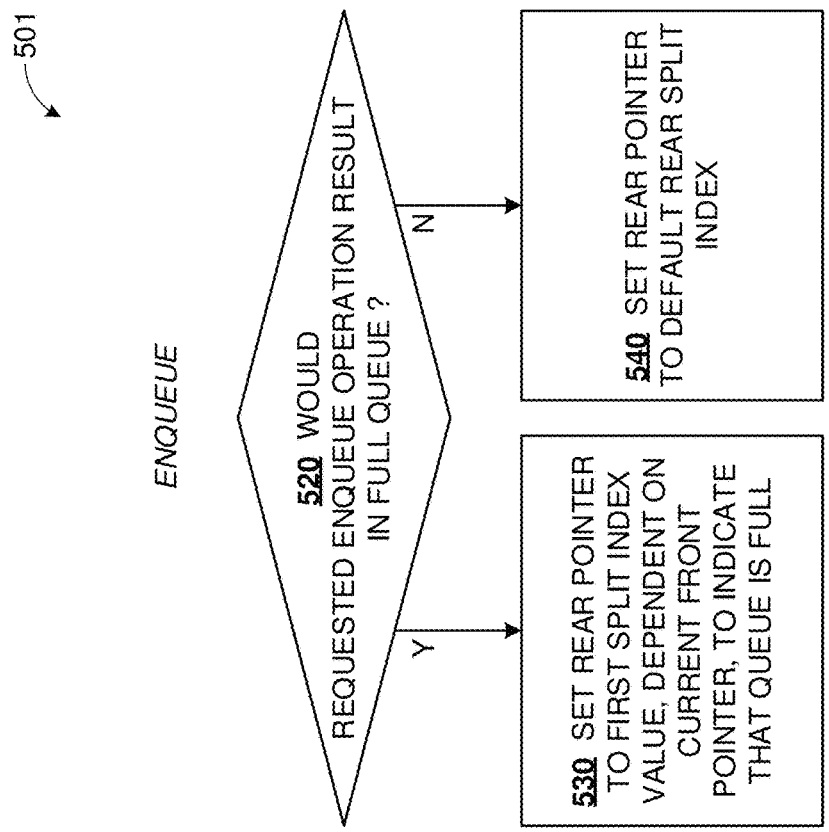

FIGS. 5A-5B are flowcharts 501, 502 of exemplary methods according to the disclosed technologies. The illustrated methods can be performed independently or together, can be performed by a controller or processor as disclosed herein, or can be embodied as computer-executable instructions on computer-readable storage media. The methods pertain to a disclosed circular queue (similar to 103 of FIG. 1) having a plurality N of storage elements, each element having a pair of split index values as described in context of FIG. 1. Front and rear pointers (similar to 129, 121) can be associated with dequeue and enqueue operations respectively and can store respective split index values. Particularly, a full state of the queue can be indicated by a first value of the rear pointer (dependent on a current value of the front pointer), and an empty state of the queue can be indicated by a second value of the front pointer (dependent on a current value of the rear pointer).

FIG. 5A depicts a method associated with enqueue operations, in particular for setting a rear pointer responsive to a requested enqueue operation. At decision block 520, a determination can be made whether a requested enqueue operation would result in the queue reaching the full state.

Upon affirmative determination, the method can follow the Y branch from block 520 to block 530, and the rear pointer can be set to the first split index value. As noted above, the first split index value, in conjunction with the current value of the front pointer, can indicate that the queue is full. In another case, where the determination at block 520 is negative (i.e. the enqueue operation would not lead to a full queue), the method can proceed via the N branch from block 530 to block 540, where the rear pointer can be set to a default rear split index value.

FIG. 5B depicts a method associated with dequeue operations, in particular for setting a front pointer responsive to a requested dequeue operation. At decision block 570, a determination can be made whether a requested dequeue operation would result in the queue reaching the empty state. Upon affirmative determination, the method can follow the Y branch from block 570 to block 580, and the rear pointer can be set to the second split index value. As noted above, the second split index value, in conjunction with the current value of the rear pointer, can indicate that the queue is empty. In another case, where the determination at block 570 is negative (i.e. the dequeue operation would not lead to an empty queue), the method can proceed via the N branch from block 570 to block 590, where the front pointer can be set to a default front split index value.

As discussed for the example implementation of FIG. 4, the default rear and front split index values can be odd split index 403 and even split index 404 respectively. With reference to FIG. 1, the default rear split index can take values 1, 3, 5, 7, . . . , 19, and the default front split index can take values 0, 2, 4, 6, . . . , 18. As discussed in context of FIG. 1, the split index values can wrap around.

Numerous variations and extensions of these methods can be implemented within scope of the disclosed technologies. In some examples, the methods of FIGS. 5A-5B can be performed together by different software threads. That is, a first thread can perform the enqueue-side method of FIG. 5A, while a second thread distinct from the first thread can perform the dequeue-side method of FIG. 5B. In varying examples, the two threads can be executed by a same core, by different cores on a single processor, or by different processors. The two threads can operate in parallel and asynchronously. The two threads can be non-blocking (except in cases where the queue is empty or full). The two threads can operate without writing to any common memory location, and can run without locks. The variations and extensions described are exemplary. Other variations and extensions described herein can also be employed with embodiments of FIGS. 5A-5B.

The disclosed methods can be performed by processors executing software programs, within a variety of integrated circuit or boxed devices, for a wide range of applications, including but not limited to those disclosed herein.

Example System

Figure 6:
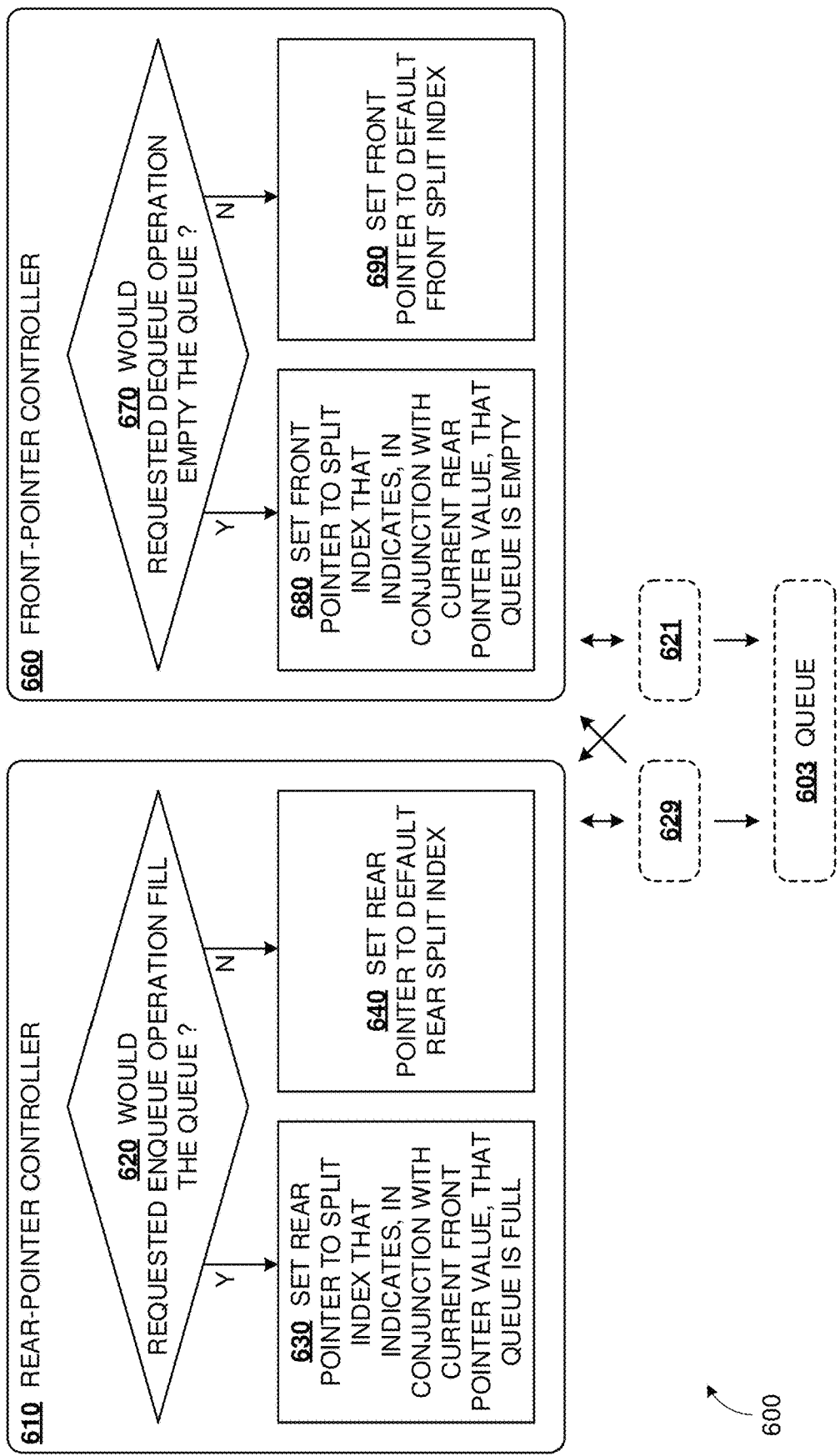
FIG. 6 is a diagram of a system controlling a circular queue according to the disclosed technologies.

FIG. 6 is a diagram 600 of a system controlling a circular queue according to the disclosed technologies. The system employs respective controllers to control front and rear pointers for the queue. The system can be embodied as hardware, as software, or as computer-executable instructions.

The system can manage a disclosed circular queue (similar to 103 of FIG. 1) having a predetermined number of elements, each of a predetermined size. The elements can be indexed using respective element indexes (similar to 110). Each element index can be split into a respective pair of split indexes (120). A rear pointer (121) can be updated when an enqueue operation is performed, and a front pointer (129) can be updated when a dequeue operation is performed.

The system can include rear-pointer controller 610 and front-pointer controller 660. As shown at decision block 620, rear-pointer controller 610 can be configured to determine whether a requested enqueue operation would fill the queue. Depending on whether the determination is yes or no, rear-pointer controller 610 can be configured to set the rear pointer according to block 630 (Y branch from block 620) or according to block 640 (N branch from block 620). That is, if yes, then the rear pointer can be set to a given rear split index that indicates, in conjunction with a current value of the front pointer, that the queue is full, as shown at block 630. If no, then the rear pointer can be set to a default rear split index, as shown at block 640. The default rear split index is not a predetermined constant (which would imply an association with just a single queue element), but is a default split index for an instant element index. With reference to FIG. 1 or FIG. 4, the default rear split index can be 1, 3, 5, . . . , 19 for element index 0, 1, 2, . . . , 9 respectively.

Turning to front-pointer controller 660, decision block 670 depicts front-pointer controller 660 configured to evaluate whether a requested dequeue operation would empty the queue. Blocks 680, 690 depict setting the front pointer in respective cases. If the determination at block 670 is yes, then, following the Y branch from block 670 to block 680, front-pointer controller 670 can be configured to set the front pointer to a given front split index that indicates, in conjunction with a current value of the rear pointer, that the queue is empty. If the determination at block 670 is no, then, following the N branch from block 670 to block 690, front-pointer controller 660 can set the front pointer to a default front split index. Like the default rear split index, the default front split index is a default split index for an instant element index. With reference to FIG. 1 or FIG. 4, the default front split index can be 0, 2, 4, . . . , 18 for element index 0, 1, 2, . . . , 9 respectively. Other choices for the default front and rear split index values can also be made. In some examples, the default front and rear split indexes can be complementary, for any given element index.

Front and rear-pointer controllers 610, 660 can be coupled to front pointer register 621 and rear pointer register 629 respectively. As indicated by arrows in FIG. 6, rear-pointer controller 610 can read and write rear pointer register 629, and can read front pointer register 621. Similarly, front-pointer controller 660 can read and write front pointer register 621 and can also read rear pointer register 629. Because each register 629, 621 is written by only one of controllers 610, 660, a lock between these controllers is not required. Furthermore controllers 610, 660 can operate on different or asynchronous clocks. The front pointer value stored in front pointer register 621 can point to the next element to be dequeued in queue 603, while the rear pointer value stored in rear pointer register 629 can point to a next element to receive enqueued data in queue 603.

Registers 621, 629 are shown in dashed outline to indicate that the illustrated innovative example need not include registers 621, 629, which can be implemented as external devices. However, other innovative embodiments can include registers 621, 629, as also the queue 603. A similar convention is followed in other figures.

Numerous variations and extensions of these systems can be implemented within scope of the disclosed technologies. In some examples, the front- and rear-pointer controllers 660, 610 can be integrated with front and rear pointer registers 621, 629. As shown in FIG. 3, the illustrated system can be further integrated with additional enqueue logic components (312) and dequeue logic components (362). Example systems can operate with queue 603 resident on an external memory device, or controllers 610, 660 and queue 603 can be integrated on a single integrated circuit or within a box device.

In some examples, the split indexes of any given queue element can be denoted even and odd. For a rear pointer pointing to a particular element of the queue, the default rear split index can be the odd split index of the element immediately following the particular element. That is, an instant enqueue operation can write to the particular element and, following the write, the rear pointer can be advanced to the odd split index of the next element. For a front pointer pointing to another element of the queue, the default front split index can be the even split index of the element immediately following the another element. That is, an instant dequeue operation can retrieve data from the another element and, following the retrieval, the front pointer can be advanced to the even split index of the next element.

In some examples, the given rear split index (for indicating a full queue) can be the same as the current value of the front pointer, and the given front split index (for indicating an empty queue) can be distinct from the current value of the rear pointer. In other examples, the given rear split index can be distinct from the current value of the front pointer, and the given front split index can be the same as the current value of the rear pointer.

In some examples, the system can include a computing device and program memory storing instructions which, when executed by the computing device, cause the system to implement the front-pointer controller and the rear-pointer controller. In other examples, the system can include first electronic circuitry hard-wired as the rear-pointer controller and second electronic circuitry hard-wired as the front-pointer controller.

In some examples, the system can include additional components shown in FIG. 3, such as memory locations (similar to 321, 329 or 621, 629) coupled to receive and store updated values of front and rear pointers from front-pointer controller 660 (360) and rear-pointer controller 610 (310) respectively. Each of these memory locations can provide current values of the respective pointer to both controllers 660, 610. The system can include a demultiplexer (314) configured to receive the current value of the rear pointer and to forward a data entry (333) to an element of queue 603 (303) designated by the current value of the rear pointer, in response to a write enable signal (335) received from rear-pointer controller 610 (310). The system can include a multiplexer (364) configured to receive the current value of the front pointer and to forward a data entry (383) from an element of queue 603 (303) designated by the current value of the front pointer, in response to a read enable signal (385) received from front-pointer controller 660 (360). In further examples, the system can include additional memory elements implementing queue 603 (303).

In some examples, front-pointer controller 660, rear-pointer controller 610, and queue 603 can be integrated in a CPU module. Queue 603 can be operated as an instruction buffer. In further examples, front-pointer controller 660, rear-pointer controller 610, and queue 603 can be integrated in a network router or a network switch. Queue 603 can be operated as a packet buffer. In additional examples, front-pointer controller 660, rear-pointer controller 610, and queue 603 can be integrated in a media streaming apparatus. Queue 603 can be operated as a media stream buffer. In other examples, front-pointer controller 660 and rear-pointer controller 610 can be incorporated in a load balancer configured to distribute a stream of tasks among a plurality of processors. Elements of queue 603 can store descriptors of respective tasks.

In some examples, front-pointer controller 660 and rear-pointer controller 610 can be incorporated in an integrated circuit. The integrated circuit can also include a port for interfacing with an external memory device on which queue 603 can be stored. In further examples, the integrated circuit can be a packet processor, and the enqueue and dequeue operations can transfer network data packets between the packet processor and the external memory device. In other examples, the integrated circuit can be a media processor, and the enqueue and dequeue operations can transfer media frames between the media processor and the external memory device.

Additional implementation details of exemplary disclosed systems are provided herein, e.g. in context of FIG. 3 or FIG. 4. The variations and extensions described are exemplary. Other variations and extensions described herein can also be employed with embodiments of FIG. 6.

Example Apparatus

Figure 7:
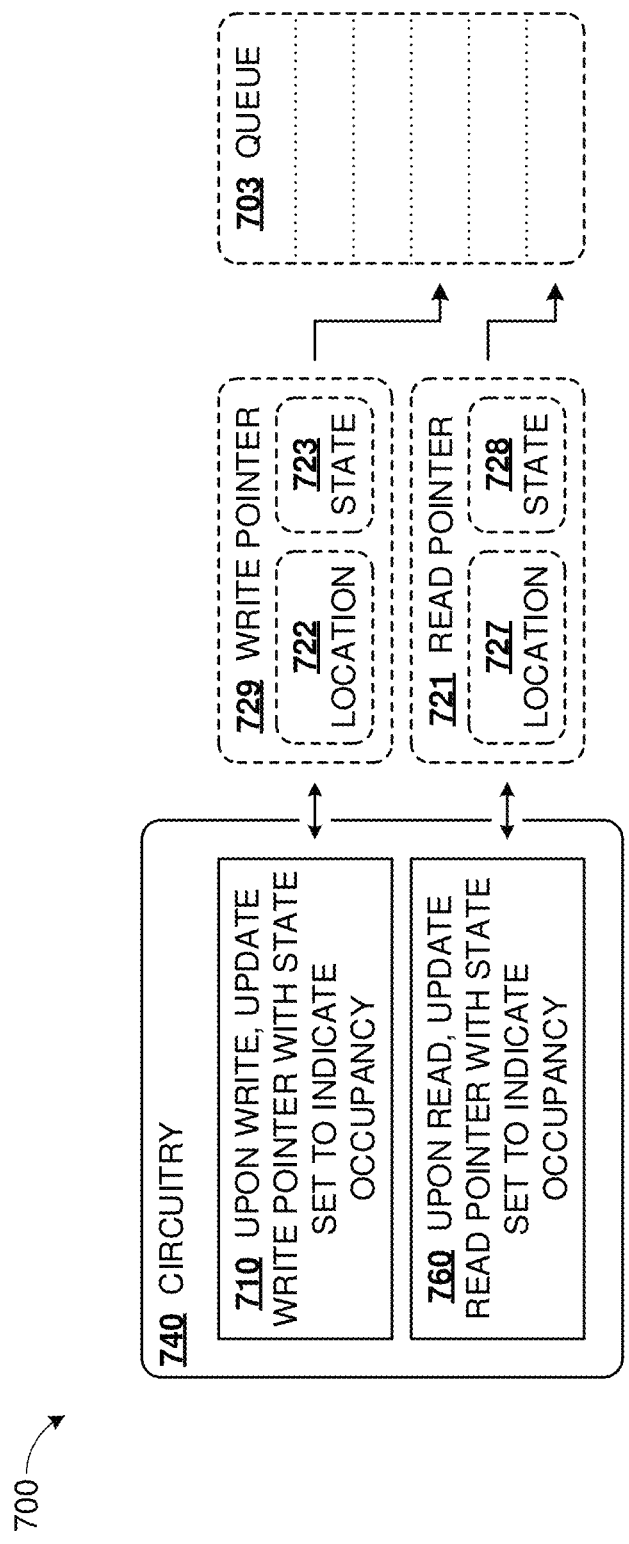
FIG. 7 is a diagram of circuitry configured to manage pointers of a circular queue according to the disclosed technologies.

FIG. 7 is a diagram 700 of apparatus configured to manage pointers of a circular queue according to the disclosed technologies. The apparatus includes circuitry 740.

Circuitry 740 can be configured to implement write pointer 729 and read pointer 721, although the memory devices storing the pointer values can be external to circuitry 740 as described herein. Circuitry 740 can be configured to interpret the contents of write pointer 729 as comprising a write location 722, which can be an index of an element of queue 703, and a write pointer state 723, which can distinguish two split indexes for write location 722. Similarly, circuit 740 can be configured to interpret the contents of read pointer 721 as comprising a read location 727, which can be an index of an element of queue 703, and a read pointer state 728, which can distinguish two split indexes for read location 727.

Queue 703 can have a plurality (N) of storage locations and an occupancy ranging from zero to N. Because there are N+1 occupancy values but only N elements and N index values, some combination of read and write locations can correspond to two distinct values of occupancy, which can be distinguished based on write pointer state 728 and read pointer state 723 as described herein.

Circuitry 740 can be configured to manage queue 703 (which, like pointers 729, 721, can be implemented on memory devices external to circuitry 740) as a circular FIFO queue by performing the following operations. Responsive to a write operation on queue 703, write pointer 729 can be updated, which can include setting write pointer state 723 to indicate the queue occupancy, as shown at block 710. Responsive to a read operation on queue 703, read pointer 721 can be updated, which can include setting read pointer state 728 to indicate the queue occupancy, as shown at block 760. Read and write operations can also respectively advance read location 727 and write location 723.

Numerous variations and extensions of such apparatus can be implemented within scope of the disclosed technologies.

In some examples, for equal values of write location 722 and read location 727, a first value of write pointer state 723 can be defined based on a current value of read pointer state 728 to indicate that queue occupancy is N, and a second value of read pointer state 728 can be defined based on a current value of write pointer state 723 to indicate that queue occupancy is zero. Operation 710 can set write pointer state 723 to the first value. Operation 760 can set read pointer state 728 to the second value. In further examples, the first value can be equal to the current value of the read pointer state, and the second value can be complementary to the current value of the write pointer state. In other examples, the first value can be complementary to the current value of the read pointer state, and the second value can be equal to the current value of the write pointer state.

In some examples, the apparatus can include an integrated circuit in which circuitry 740 is hard-wired to perform operations 710, 760. In other examples, the apparatus can include one or more hardware processors and computer-readable media storing instructions which, when executed, cause the circuitry to perform operations 710, 760.

In some examples, one or more of the apparatuses and their respective queues can be incorporated into a system configured to implement a network of processes. The system can include a plurality of processor cores with associated memory. The cores can be configured to perform the processes concurrently. Each of the apparatuses and its respective queue can be used to buffer data between a respective pair of the processes. In further examples, the system can include two or more apparatuses. The queue of a first apparatus can be used to buffer data from process A to process B, while the queue of a second apparatus can be used to buffer data from process B to process A. In additional examples, the processes can include three processes A, B, C, and the queue of the first apparatus can be used to buffer data from process A to process B, while the queue of the second apparatus can be used to buffer data from process C to process A or process B, or to process C from process A or process B. In further examples, processes A, B, C can perform successive stages of image processing, and the buffered data can include successive images or successive image macroblocks stored one per element of the first or second queue. The network of processes can be image processing tasks arranged in a graph, and the system can be a computer vision system.

Because write operations cause updates to write pointer 729 but not to read pointer 721, and read operations cause updates to read pointer 721 but not to write pointer 729, queue 703 can be managed as a lock-free queue.

Some disclosed examples can include SRAM comprising the storage locations of queue 703. Innovative examples can also include memory devices (instantiated as SRAM or as registers) storing pointers 729, 721.

The variations and extensions described are exemplary. Other variations and extensions described herein can also be employed with embodiments of FIG. 6.

Example Device Architectures

Figure 8:
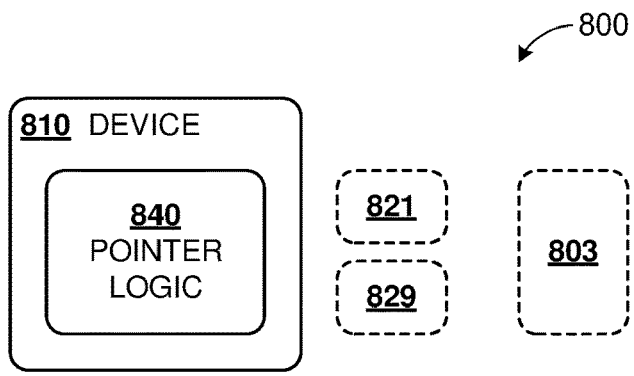
FIG. 8 is a diagram of a first device architecture implementing examples of the disclosed technologies.
Figure 9:
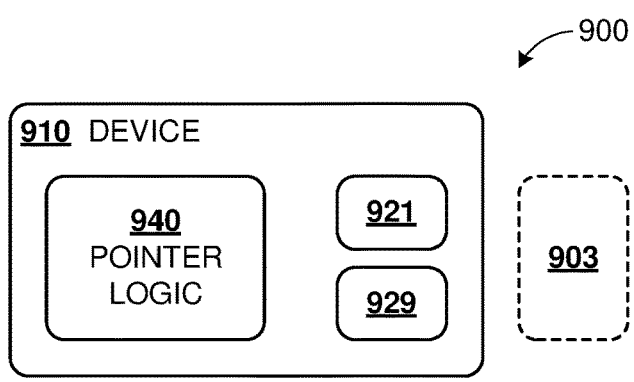
FIG. 9 is a diagram of a second device architecture implementing examples of the disclosed technologies.
Figure 10:
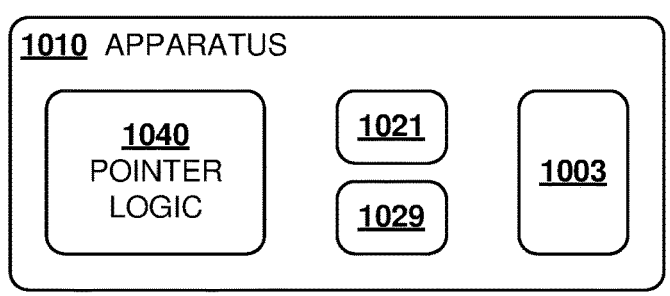
FIG. 10 is a diagram of a third device architecture implementing examples of the disclosed technologies.

FIGS. 8-10 illustrate example architectures of devices which can implement the disclosed technologies. In these figures, pointer logic 840, 940, 1040 denotes circuitry implementing pointer management according to any of the examples disclosed herein. The circuitry can be hard-wired or controlled by software.

FIG. 8 is a diagram 800 of a first device architecture in which pointer logic 840 is included within device 810, while queue 803 and front and rear pointers 821, 829 reside in memory external to device 810. Such an architecture can be suitable for software implementations of the disclosed technologies, in which pointer logic is a processor configured to perform software operations to implement innovative operations disclosed herein. In varying examples, pointer logic 840 can be configured to perform operations of rear controller 310, enqueue logic 312, front controller 360, dequeue logic 362, FIG. 5A, FIG. 5B, FIG. 4E, FIG. 4F, rear controller 610, front controller 660, or FIG. 6.

FIG. 9 is a diagram 900 of a second device architecture in which pointer logic 940 and pointer registers 929, 921 are implemented within device 910, while queue 903 is implemented in memory external to device 910. Architecture 900 can be suitable for integrated circuit implementations of the disclosed technologies (including hard-wired and processor-based implementations), which utilize off-chip memory for queue 903. Architecture 900 can be suitable for applications which are configurable or which require large queues (e.g. large length, large width, or large product of length×width). Non-limiting examples of architecture 900 can include a network of processes, a load balancer, or a packet processor for a network router or switch. Pointer logic 940 can be implemented in different configurations as described in context of FIG. 8 or elsewhere herein.

FIG. 10 is a diagram 1000 of a third device architecture in which pointer logic 1040, pointer registers 1029, 1021, and queue 1003 are all contained within device 1010. Architecture 1000 can be suitable for integrated products, whether contained on an integrated circuit or packaged in a box. Non-limiting examples of the former include pipelined image processors, computer vision chips, or CPU modules. Non-limiting examples of the latter include network switches, network routers, or video servers. Pointer logic 1040 can be implemented in different configurations as described in context of FIG. 8 or elsewhere herein.

Example System

Figure 11:
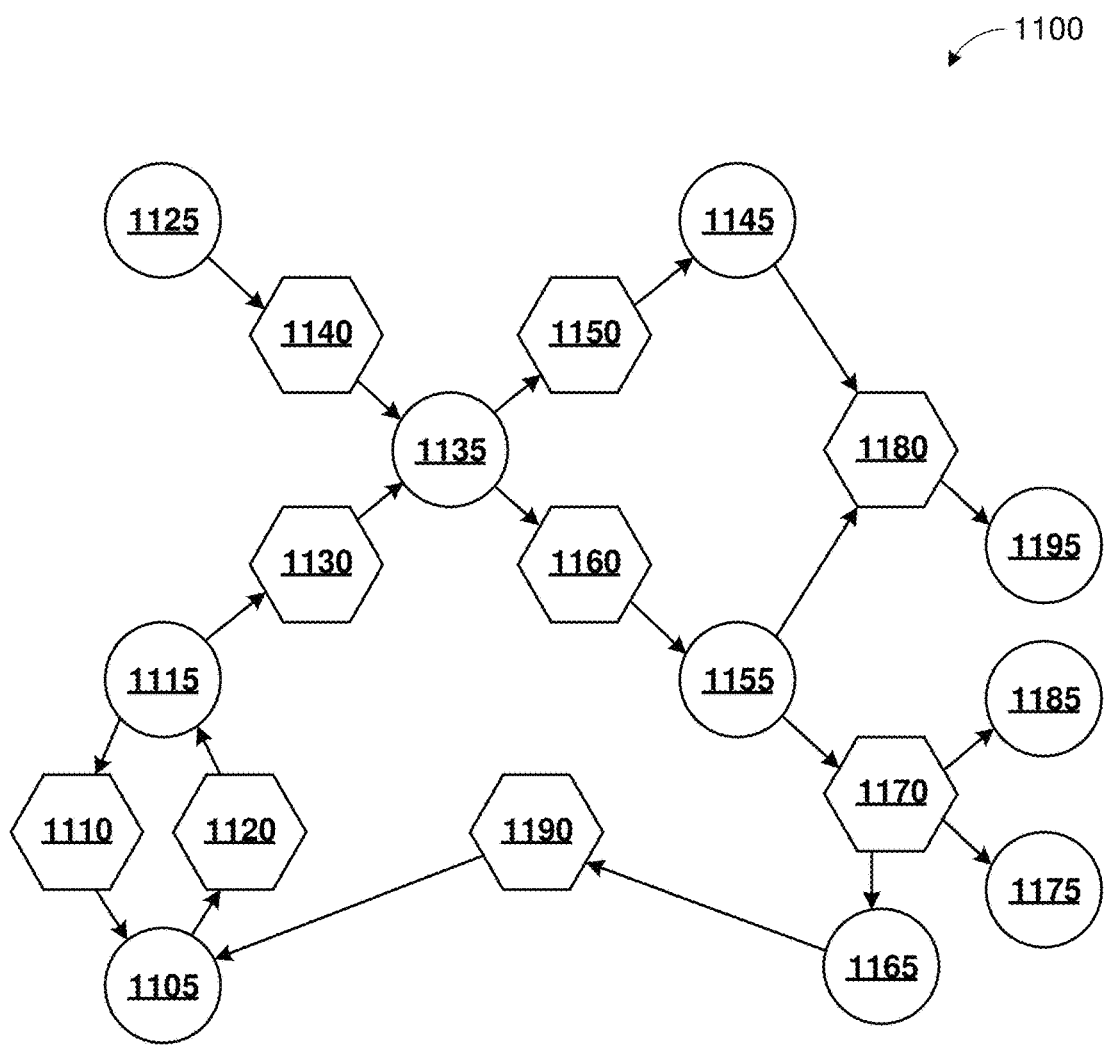
FIG. 11 is a diagram of an example system implementing the disclosed technologies.

FIG. 11 is a diagram of an example system 1100 implementing the disclosed technologies. In FIG. 11, multiple processes are shown as circles (e.g. 1125, 1135) and queues (e.g. 1140), shown as hexagons, are used to transfer data from one process to another (e.g. from process 1125 to process 1135). Innovative pointer logic (e.g. for front and rear-pointer controllers and registers for front and rear pointers) can be used to manage the queues and can be variously distributed among the illustrated circles (processes) and hexagons (queues).

In some examples, enqueue logic can be implemented by a processor providing data into a queue, while dequeue logic can be implemented by a processor receiving data from a queue. With reference to FIG. 3, hexagon 1140 can implement queue 303, while enqueue logic 312 can be implemented by one or more processors performing process 1125, and dequeue logic 362 can be implemented by one or more processors performing process 1135. In further examples, processes 1125, 1135 can be implemented on a same or different processors, which can be multi-core processors. Queue 1140 can be implemented on a processor integrated circuit, or on one or more stand-alone memory chips.

In other examples, enqueue logic and dequeue logic can be bundled as a stand-alone subsystem. That is, an innovative subsystem represented as hexagon 1140 can include queue memory (303), enqueue logic (312), and dequeue logic (362). The innovative subsystem can be instantiated co-resident with one or more processors on an integrated circuit, as an integrated circuit separate from the processor(s), or as intellectual property (IP block) in a semiconductor vendor's circuit library. In further examples, an innovative IP block can provide enqueue logic (312), and dequeue logic (362), while excluding queue memory (303).

FIG. 11 depict several configurations in which processes and queues can be configured to work together.

In some instances, two queues can support bidirectional data transfer between two processes. For example, process 1105 can transfer data to process 1115 through queue 1120, while process 1115 can transfer data to process 1105 through queue 1110.

In some instances, a single process can receive data from two or more queues. For example, processes 1115, 1125 both transfer data to process 1135 through respective queues 1130, 1140.

In some instances, a single process can provide data to two or more queues. For example, process 1135 can transfer data to processes 1145, 1155 through respective queues 1150, 1160 respectively.

In some instances, two or more processes can enqueue data to a single queue. For example, queue 1180 receives enqueue requests and corresponding data from processes 1145, 1155, while providing data to process 1195.

In some instances, two or more processes can dequeue data from a single queue. For example, queue 1170 can receive dequeue requests from, and provide data to, processes 1165, 1175, 1185.

In some instances, queue-mediated data paths can form loops. An example of a short loop is 1105→1120→1115→1110, while an example of a longer loop is via queues 1120, 1130, 1160, 1170, 1190.

The configurations illustrated in FIG. 11 are merely illustrative. A wide range of regular and irregular process networks can be implemented using these principles.

Example Circular Queue with Multiplexed Ports

Figure 12:
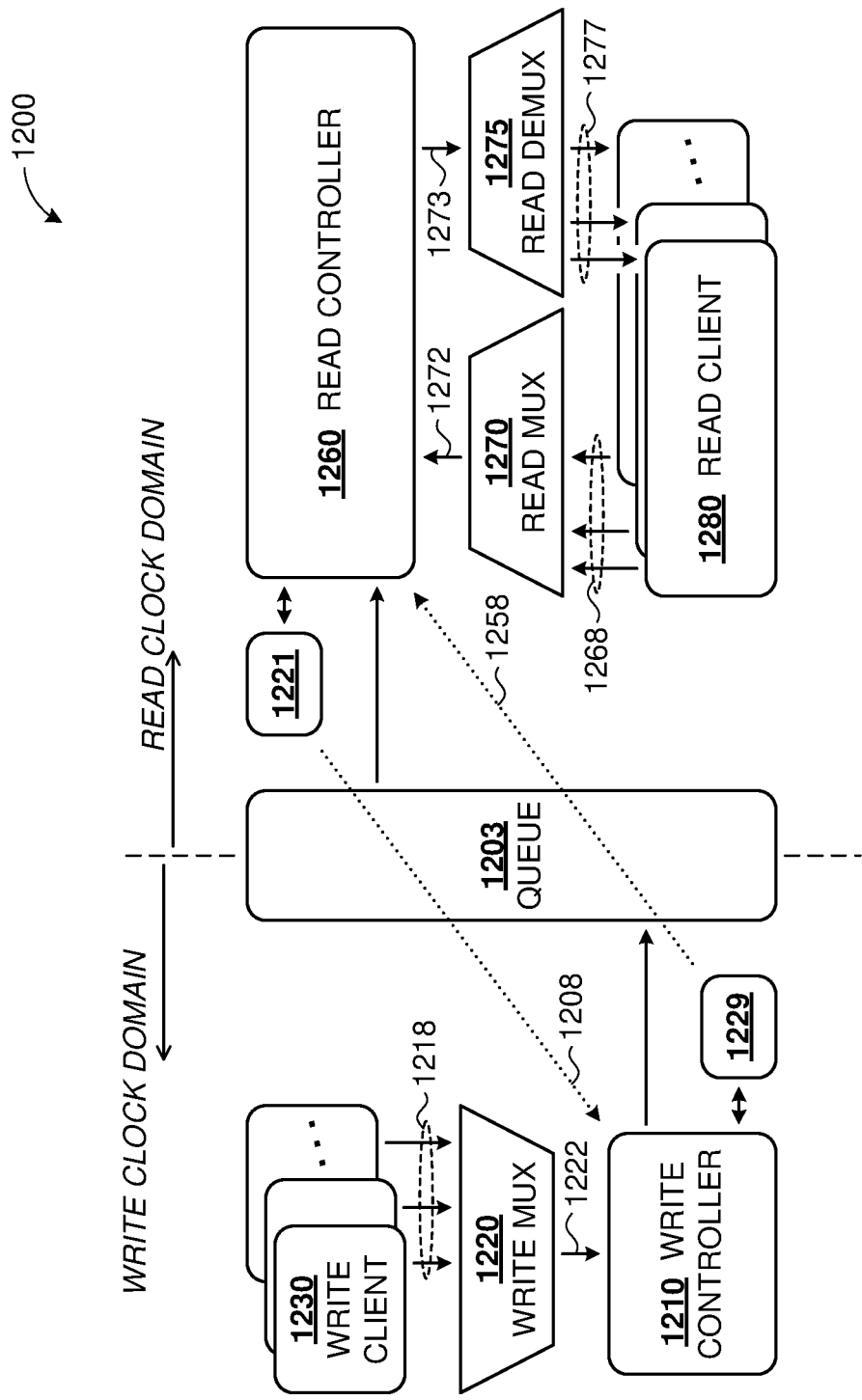
FIG. 12 is a block diagram of an example circular queue with multiplexed ports according to the disclosed technologies.

FIG. 12 is a block diagram 1200 of an example circular queue configured to work with multiple write clients or multiple read clients. Queue 1203 is coupled to write controller 1210 and write pointer 1221, which collectively provide enqueue logic functionality similar to 312 of FIG. 3. Particularly, write controller 1210 can enqueue data at an index position of queue 1203 specified by write pointer 1229, and can update write pointer 1229 as enqueue operations are performed.

On the dequeue side, queue 1203 is coupled to read controller 1260 and read pointer 1221, which collectively provide dequeue logic functionality similar to 362 of FIG. 3. Particularly, read controller 1260 can dequeue data from an index position of queue 1203 specified by read pointer 1221 and can update read pointer 1221 as dequeue operations are performed.

Dotted arrows 1208, 1258 show that write and read controllers 1210, 1260 receive input from each other's pointers 1221, 1229. For example, as described in context of FIG. 4 and elsewhere herein, write controller 1210 can use a current value of read pointer 1221 to determine whether queue 1203 is already full, or could become full as a result of an imminent enqueue operation. Similarly, read controller 1260 can use a current value of write pointer 1229 to determine whether queue 1203 is already empty, or could become empty as a result of an imminent dequeue operation.

In some examples, it can be desirable for queue 1203 to receive data from multiple write clients (similar to queue 1180 of FIG. 11) or to provide data to multiple read clients (similar to queue 1170 of FIG. 11). In FIG. 12, write multiplexer (WRITE MUX) 1220 can aggregate or select among enqueue requests and accompanying data 1218 from multiple write clients 1230. Arrow 1222 represents an enqueue request and its accompanying data conveyed from write multiplexer 1220 to write controller 1210, one enqueue request at a time. In further examples, each arrow 1218 can be implemented as a respective circular queue (not shown) according to the disclosed technologies. That is, each write client 1230 can place enqueue requests into its respective queue, to be dequeued and forwarded one at a time by write multiplexer 1220.

On the read side, dequeue requests 1268 from multiple read clients 1280 can be multiplexed by read multiplexer (READ MUX) 1270 and forwarded one at a time (arrow 1272) to read controller 1260. The dequeued data 1273 can be demultiplexed by read demultiplexer (READ DEMUX) 1275 and distributed to the requesting read client 1280 as indicated by arrows 1277.

Multiplexers 1220, 1270 can use various procedures to arbitrate between clients 1230 or clients 1280. Non-limiting examples of arbitration procedures include round-robin, first-come-first-served, or prioritization based on e.g., number of unserved requests for the various clients.

FIG. 12 also shows dequeue side components operating in a read clock domain, while enqueue side components operate in a write clock domain. In some examples, the read and write clock domains can run on mutually asynchronous clocks while, in other examples, the read and write clock domains can run on synchronized clocks (with possible phase or frequency differences) or even a same clock.

Although FIG. 12 shows multiple clients for both read and write, this is not a requirement. Variations of FIG. 12 can support multiple write clients with a single read client, or a single write client with multiple read clients.

Example State Transition Diagram

Figure 13:
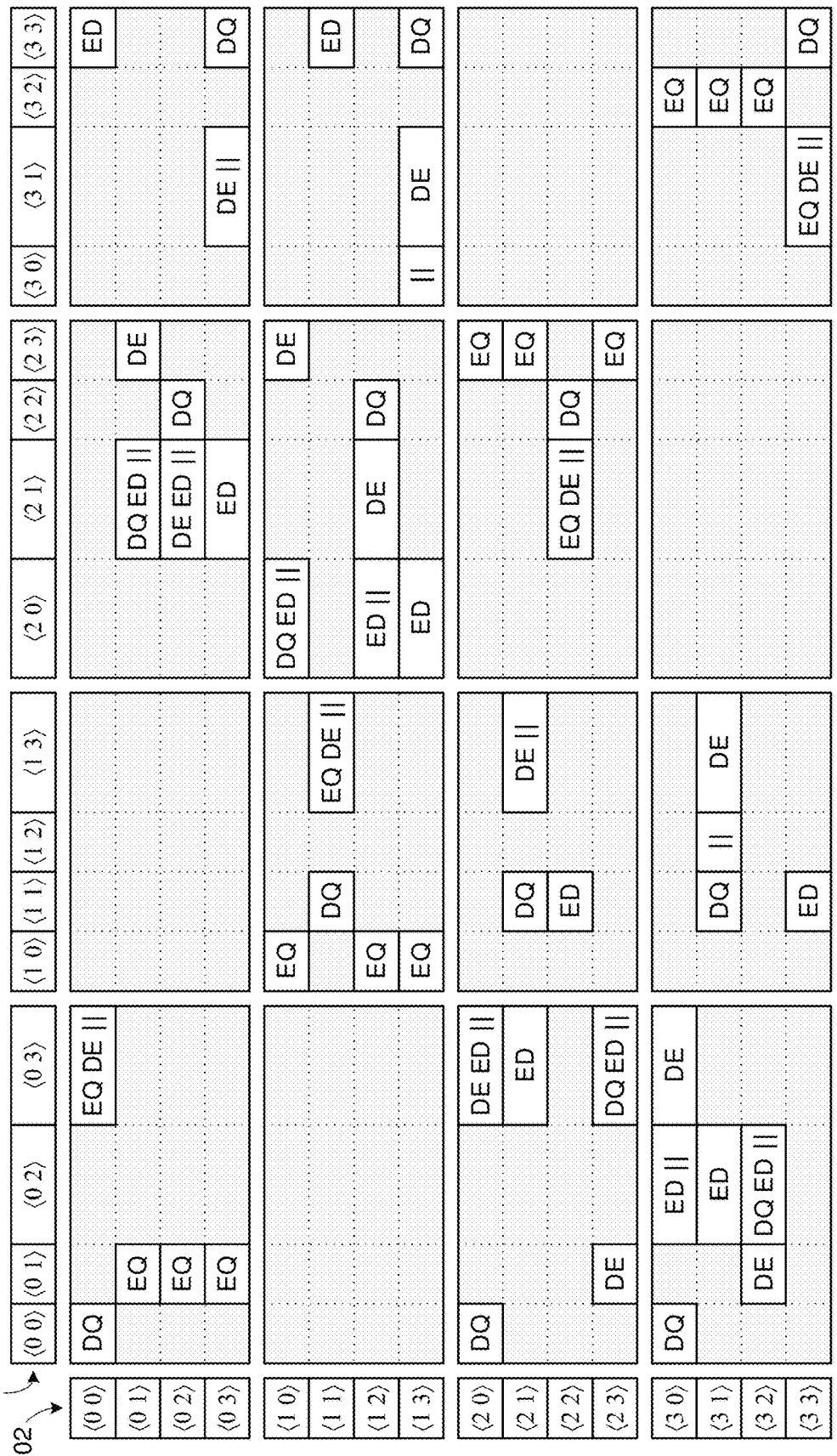
FIG. 13 is an example state transition diagram according to the disclosed technologies.

FIG. 13 is an example state transition diagram 1300 for a 2-element queue having four split indexes for each of the read pointer and the write pointer. Split index values {0, 1} apply to a first queue element and split index values {2, 3} apply to a second queue element. Accordingly, the queue and pointers can take on 16 states ⟨ f r ⟩ where f represents the front pointer which can take values from {0, 1, 2, 3} and r represents the rear pointer which can also take values {0, 1, 2, 3}. FIG. 13 depicts transitions from an initial state 1302 to a final state 1304. Initial state 1302 is shown along the left-hand side of FIG. 13, taking values from ⟨ 0 0 ⟩ to ⟨ 3 3 ⟩. Final state 1304 is shown along the top of FIG. 13, also taking values from ⟨ 0 0 ⟩ to ⟨ 3 3 ⟩. Transitions follow the description of FIG. 3 or FIG. 4.

Five types of transitions are shown in FIG. 13. Transition DQ represents a dequeue operation, with enqueue logic quiescent. Transition EQ represents an enqueue operation, with dequeue logic quiescent. Transition ∥ represents dequeue and enqueue operations occurring at the same instant, or with insufficient time separation for the later operation to be able to utilize the earlier operation. Transition DE represents an enqueue operation following a dequeue operation. Transition ED represents a dequeue operation following an enqueue operation.

The top row of state transition diagram 1300 corresponds to the queue initially empty with state ⟨ 0 0 ⟩. Thus, a DQ operation cannot proceed, and the final state remains unchanged at ⟨ 0 0 ⟩. As described herein, an EQ operation advances the rear pointer to the next index and the odd split index value, so the state advances to ⟨ 0 3 ⟩. For DE or ∥ operations, the DQ operation cannot proceed because the queue is empty, while the EQ operation proceeds as normal, and these operations also advance the state to ⟨ 0 3 ⟩. For an ED operation, both operations can proceed. First the EQ operation advances the rear pointer to 3, and then the dequeue operation advances the front pointer. However, the default front pointer value cannot be used because ⟨2 3⟩ would, in the present example, indicate a full queue. Therefore, front pointer logic sets the front pointer to 3, and the resulting state is ⟨3 3⟩, correctly indicating an empty queue.

The third row of diagram 1300 corresponds to an initial state ⟨0 2⟩ storing one entry at index 0. A DQ operation retrieves this entry and advances the front pointer to 2, which is selected from {2, 3}, which correctly represents the empty final state as ⟨2 2⟩. An EQ operation stores an entry at index 1 and advances the rear pointer from 2 to 1, which is selected from {0, 1}, as ⟨0 1⟩ correctly represents the full final state. The ||, DE, and ED all proceed independently with DQ and EQ operations. The DQ operation retrieves the entry at index 0 and advances the front pointer to 2, irrespective of whether the EQ operation has already advanced the rear pointer (away from 2) or not. The EQ operation stores an entry at index 1 and advances the rear pointer from 2 to 1, irrespective of whether the DQ operation has already advanced the front pointer (away from 0) or not.

The remaining rows represent similar behavior.

Example Performance

FIGS. 14-19 depict charts showing a variety of performance measures of the disclosed technologies, in comparison with some conventional approaches. Performance can be characterized by silicon area and circuit delay for a hard-wired implementation, or by clock cycles for a software-based implementation.

Scaling is shown as a function of both queue depth and queue width. Comparative conventional approaches include FastForward queues, which use NULL entries to distinguish empty and full queues, and Lamport queues, which limit occupancy of an N-element queue to N−1. In some charts, an innovative implementation of an N-element queue is compared with both an N-element Lamport queue (having same queue memory usage, and dubbed "Lamport+0") and an N+1 element Lamport queue (having same usable queue size, and dubbed "Lamport+1").

Hard-wired implementations were developed using Verilog and a 130 nm standard circuit library. Software-based implementations were evaluated on a multi-core processor, with enqueue and dequeue operations running as distinct threads on distinct cores. In software implementations, front and rear pointers can be placed in different cache lines to avoid cache thrashing—a phenomenon where access to a front pointer invalidates a cache copy of the rear pointer, or vice versa.

1. Area Performance

Figure 14A:
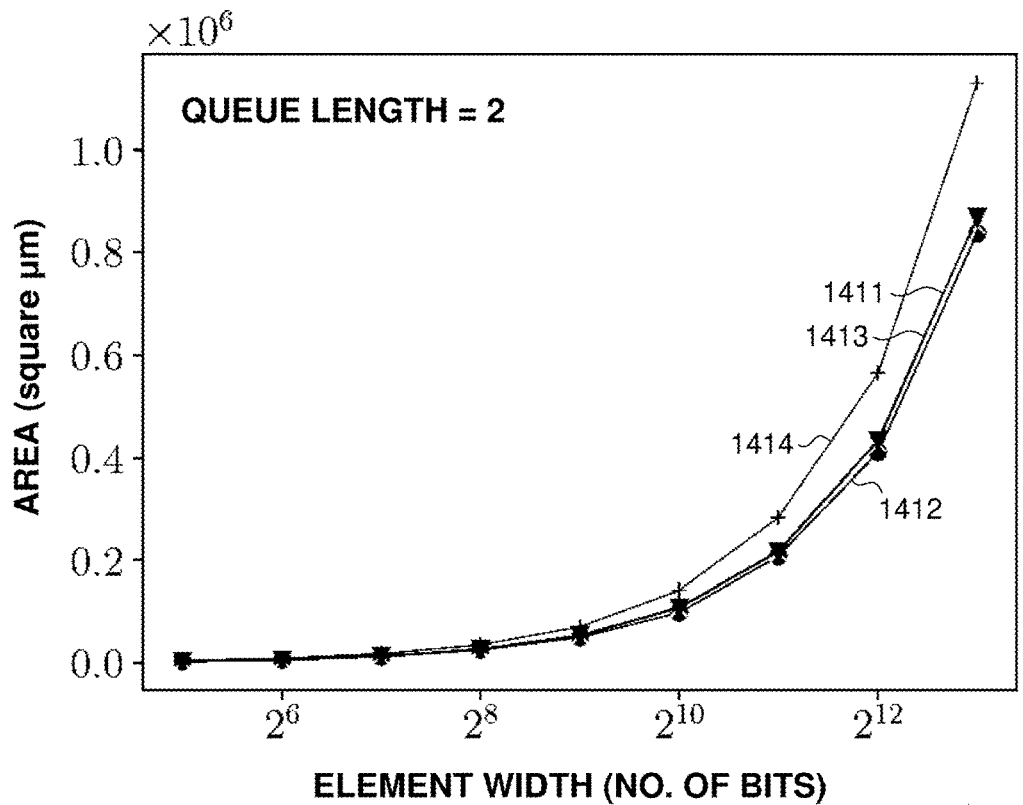
FIGS. 14A-14B are charts depicting exemplary area performance of the disclosed technologies, as a function of queue width.
Figure 14B:
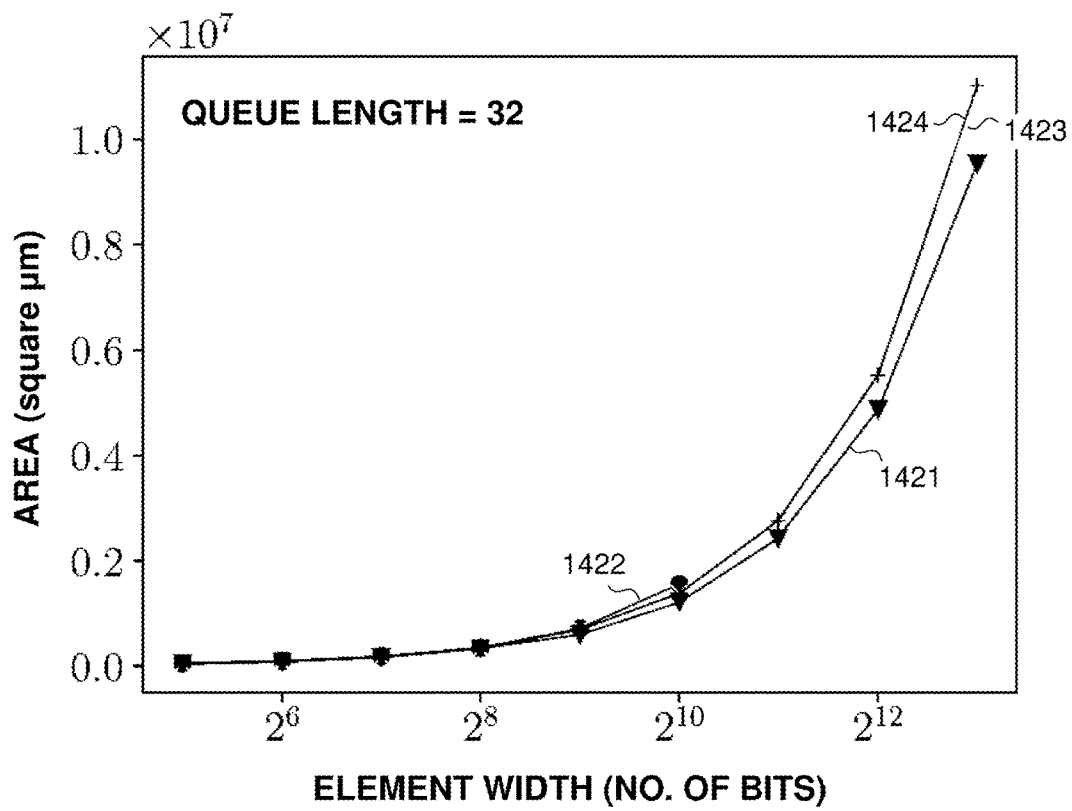

FIGS. 14A-14B are charts 1401-1402 depicting exemplary area performance as a function of queue width, from 32 bit wide elements to 8192 bit wide elements. FIGS. 14A-14B show scaling and comparison for queue lengths N=2 and N=32 respectively. Graphs 1411, 1421 plot areas for queues managed using the disclosed technologies; graphs 1412, 1422 plot areas for FastForward queues; graphs 1413, 1423 plot areas for Lamport+0 queues (i.e. N elements with N−1 maximum occupancy); and graphs 1414, 1424 plot areas for Lamport+1 queues (i.e. with N simultaneously usable elements and N+1 elements in total).

The innovative examples (graphs 1411, 1421) substantially outperform the Lamport+1 examples by up to 23% in area for the 2-element queues of FIG. 14A and up to 6% for the 32-element queue of FIG. 14B. This saving can be attributed to saving area of an extra queue element. For the 2-element queue, innovative examples 1411 require up to about 3% greater area than FastForward 1412 and Lamport+0 1413 comparative examples, which can be attributed to slightly greater complexity of the enqueue or dequeue logic. For the 32-element queue, innovative examples 1421 can be seen to be consistently better than FastForward 1422, Lamport+0 1423, and Lamport+1 1424 examples, by about 10%.

Figure 15A:
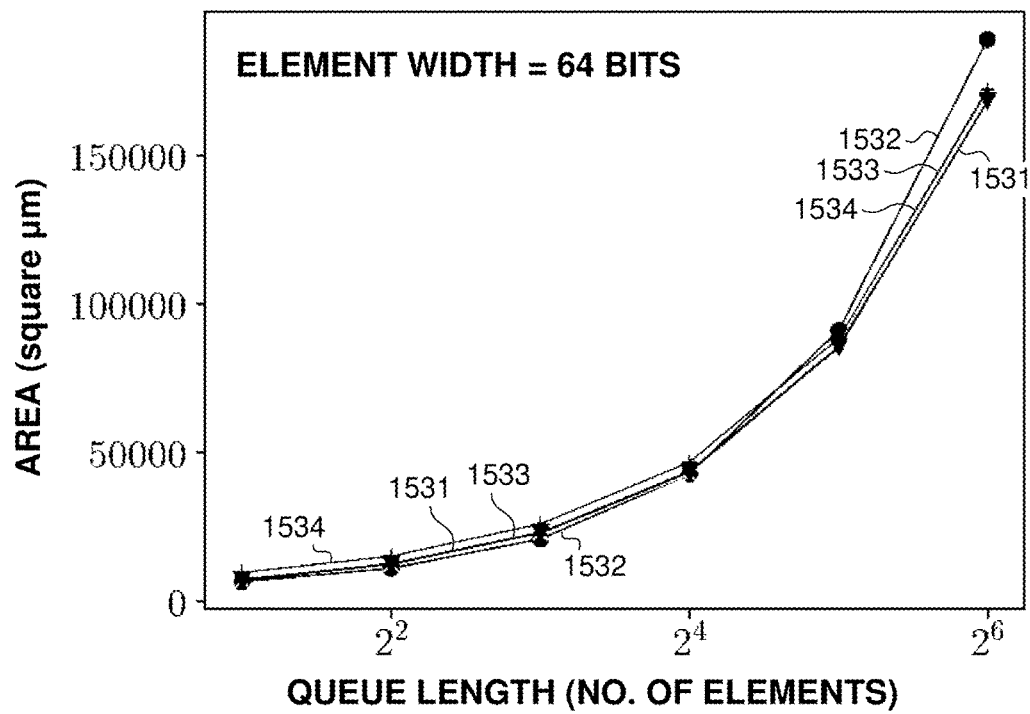
FIGS. 15A-15B are charts depicting exemplary area performance of the disclosed technologies, as a function of queue length.
Figure 15B:
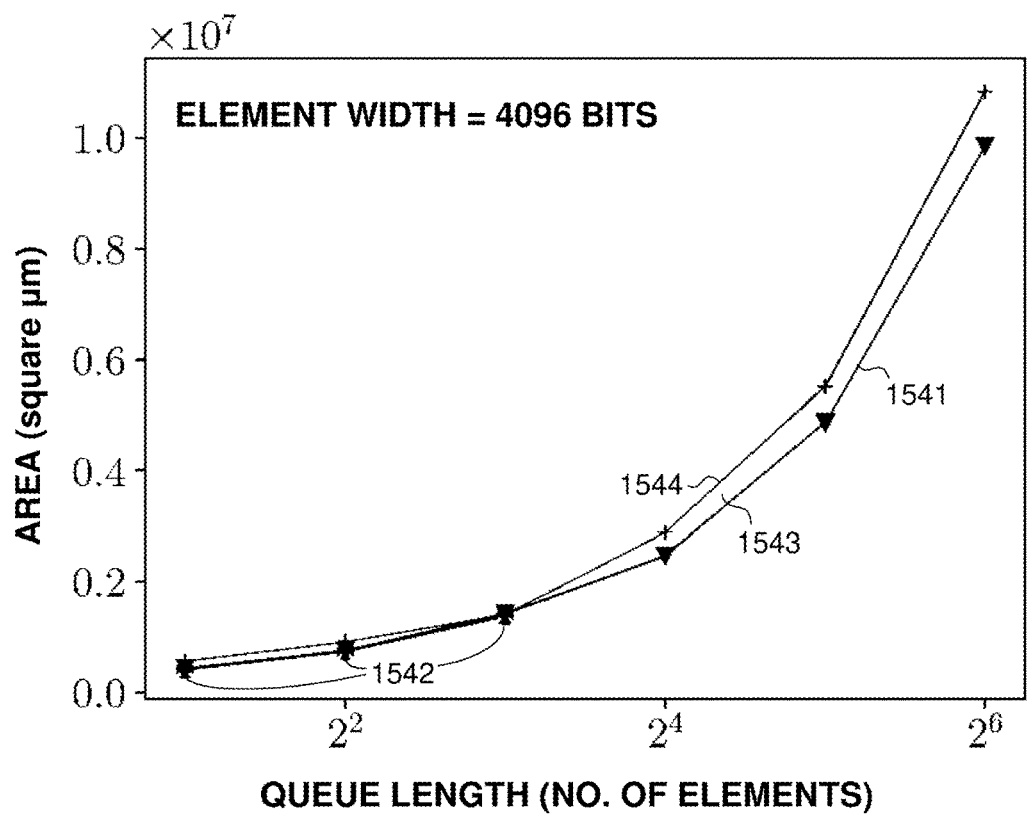

Turning to FIGS. 15A-15B, charts 1501-1502 depicting exemplary area performance as a function of queue length, from 2 elements to 64 elements. FIGS. 15A-15B show scaling and comparison for queue widths 64 bits and 4096 bits respectively. Graphs 1531, 1541 plot areas for queues managed using the disclosed technologies; graphs 1532, 1542 plot areas for FastForward queues; graphs 1533, 1543 plot areas for Lamport+0 queues; and graphs 1534, 1544 plot areas for Lamport+1 queues. FIGS. 15A-15B show innovative examples (1531, 1541) having consistently better performance than Lamport+1 queues (1534, 1544). In comparison with FastForward (1532) and Lamport+0 (1533, 1543), the innovative examples suffer a small (about 2%) area penalty for shorter queues (N<16), which turns to at least a few percent advantage for longer queues (N>16).

2. Delay Performance

Figure 16A:
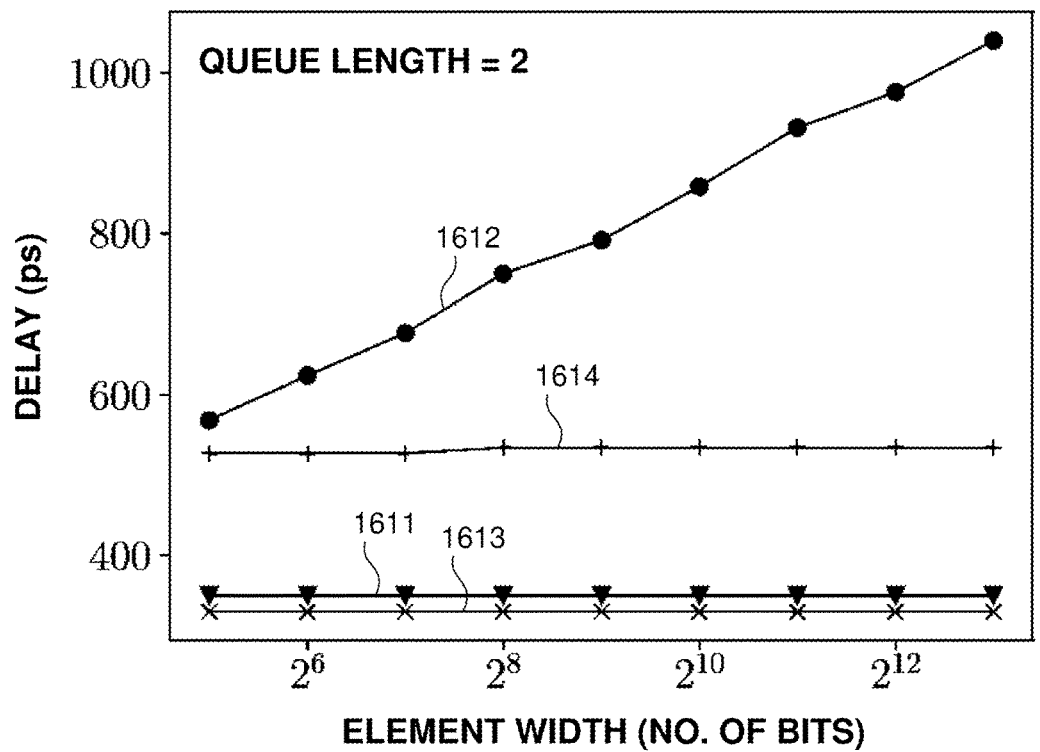
FIGS. 16A-16B are charts depicting exemplary delay performance of the disclosed technologies, as a function of queue width.
Figure 16B:
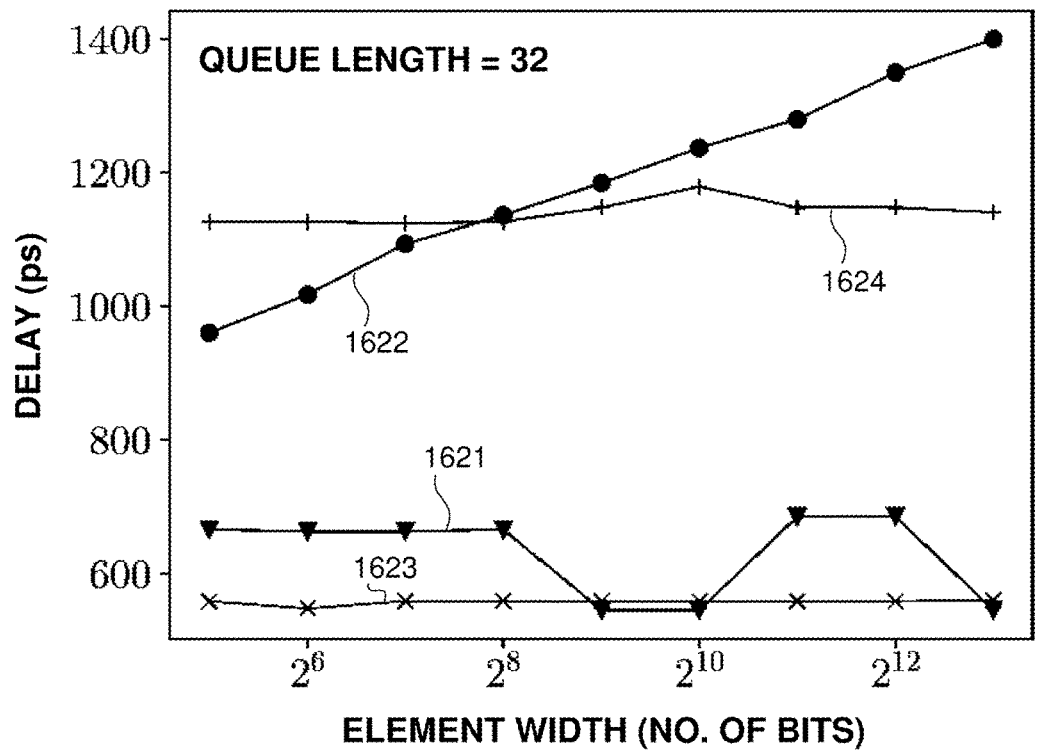

FIGS. 16A-16B are charts 1601-1602 depicting comparative delay performance of the disclosed technologies, as a function of queue width, from 32 bit wide elements to 8192 bit wide elements. FIGS. 16A-16B show scaling and comparison for queue lengths N=2 and N=32 respectively. Graphs 1611, 1621 plot delays for queues managed using the disclosed technologies; graphs 1612, 1622 plot delays for FastForward queues; graphs 1613, 1623 plot delays for Lamport+0 queues; and graphs 1614, 1624 plot delays for Lamport+1 queues.

As apparent from both FIGS. 16A-16B, the innovative examples (1611, 1621) have modestly higher delays (up to 13%) than Lamport+0 queues (1613, 1623), which can be attributed to additional levels of controller logic. However, the innovative examples (1611, 1621) are faster, by 30% or more, compared to FastForward queues (1612, 1622) or Lamport+1 queues (1614, 1624). As queue width increases, FastForward queues (1612, 1622) can require progressively more logic to check if an element has a Null value, which can explain the observed degradation in performance with increasing width.

Figure 17A:
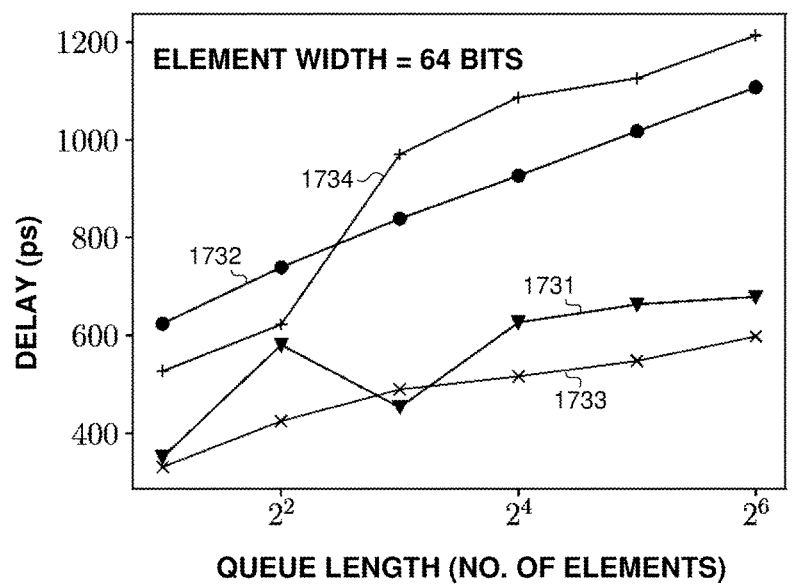
FIGS. 17A-17B are charts depicting exemplary delay performance of the disclosed technologies, as a function of queue length.
Figure 17B:
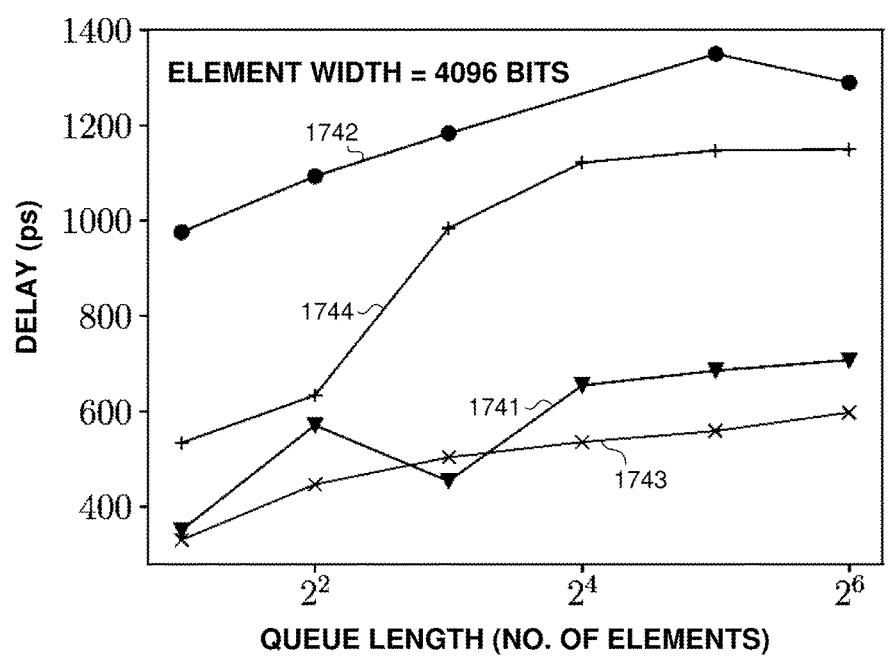

Turning to FIGS. 17A-17B, charts 1701-1702 depict exemplary delay performance of the disclosed technologies, as a function of queue length, from 2 elements to 64 elements. FIGS. 17A-17B show scaling and comparison for queue widths 64 bits and 4096 bits respectively. Graphs 1731, 1741 plot delays for queues managed using the disclosed technologies; graphs 1732, 1742 plot delays for FastForward queues; graphs 1733, 1743 plot delays for Lamport+0 queues; and graphs 1734, 1744 plot delays for Lamport+1 queues. Like FIGS. 16A-16B, FIGS. 17A-17B shows innovative examples (1731, 1741) having consistently better delay performance compared to FastForward (1712, 1722) or Lamport+1 queues (1714, 1724). Innovative examples (1731, 1741) have modestly longer delays than Lamport+0 queues.

3. Clock Cycles Performance

Figure 18A:
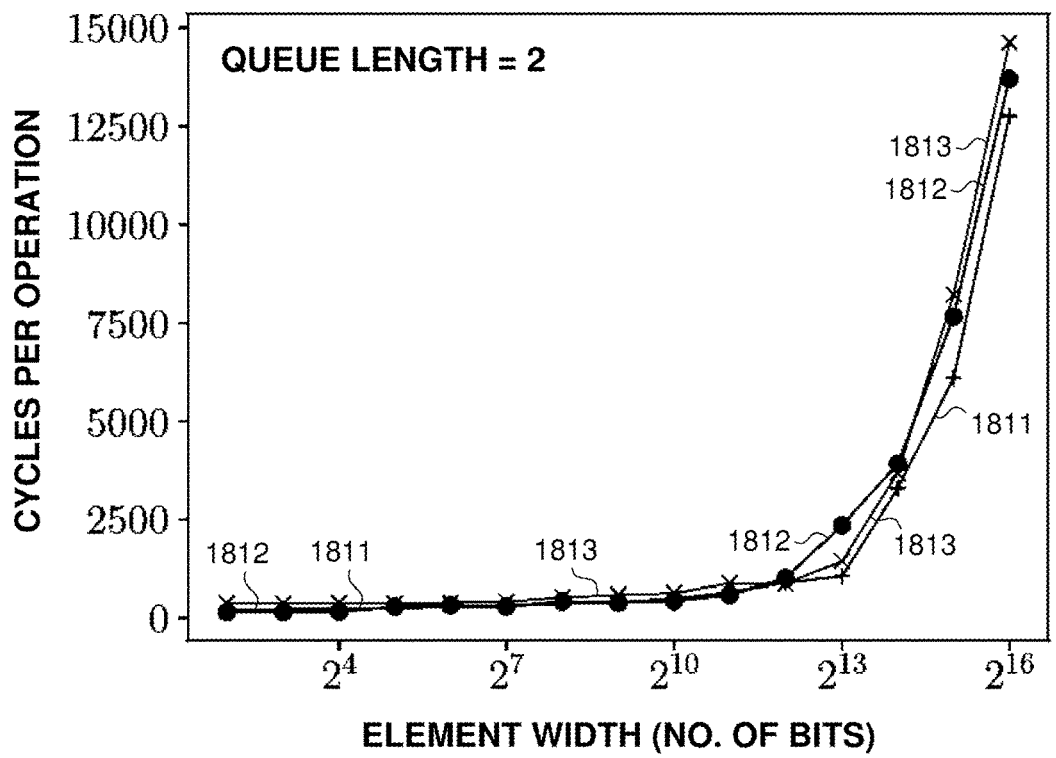
FIGS. 18A-18B are charts depicting exemplary clock cycles performance of the disclosed technologies, as a function of queue width.
Figure 18B:
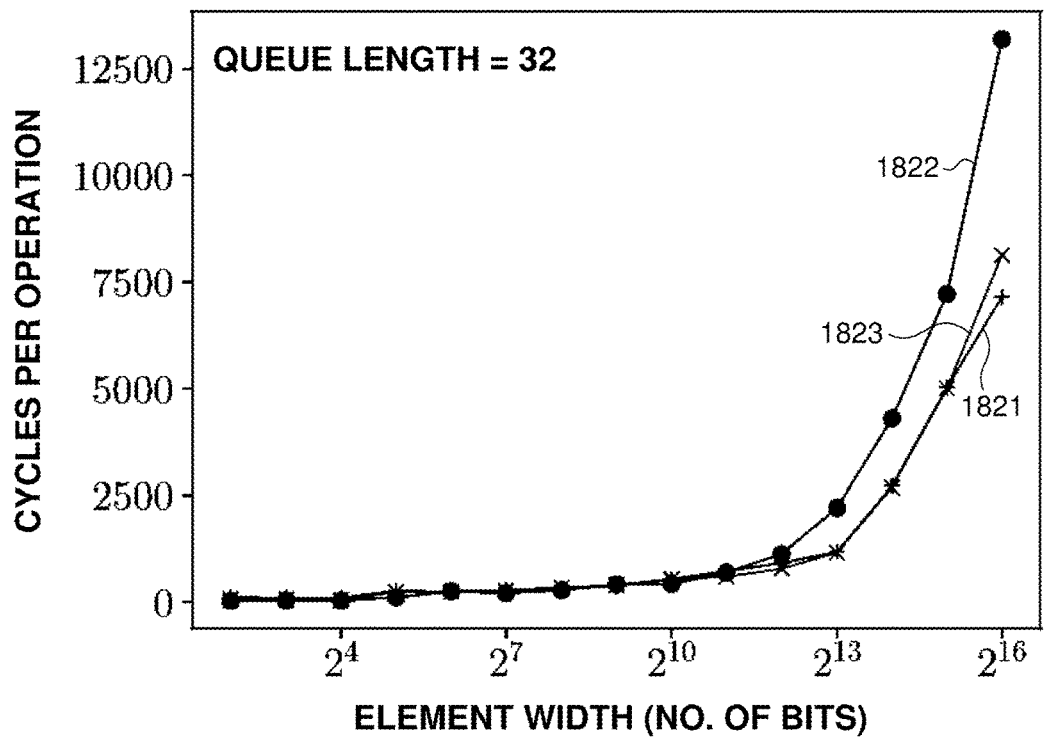

FIGS. 18A-18B are charts 1801-1802 depicting comparative clock cycle performance of the disclosed technologies, as a function of queue width, from 4 bit wide elements to 65,536 bit wide elements. FIGS. 18A-18B show scaling and comparison for queue lengths N=2 and N=32 respectively.

Graphs 1811, 1821 plot clock cycle requirements for queues managed using the disclosed technologies; graphs 1812, 1822 plot clock cycles for FastForward queues; and graphs 1613, 1623 plot clock cycles for Lamport+0 queues.

For queue length N=2, innovative examples (1811) require about 10% fewer clock cycles compared to FastForward queues (1812) and about 26% fewer clock cycles than Lamport+0 queues (1813). Because a 2-element Lamport+0 queue can only act as a single buffer (maximum occupancy is 1: a second element cannot be enqueued until the immediately preceding element has been dequeued), the enqueue and dequeue threads effectively block each other so only one can run at a time. This problem is absent in innovative examples (1811) and FastForward queues (1812), although the latter incurs a penalty for writing and checking NULL entries in vacant queue elements. This FastForward penalty is apparent in FIG. 18B for 32-element queues, where innovative examples (1821) and Lamport+0 queues (1822) offer require comparable clock cycles. The innovative examples (1821) offer about a 10% advantage over Lamport+0 queues (1823) for the widest 64 k bit queues.

Figure 19A:
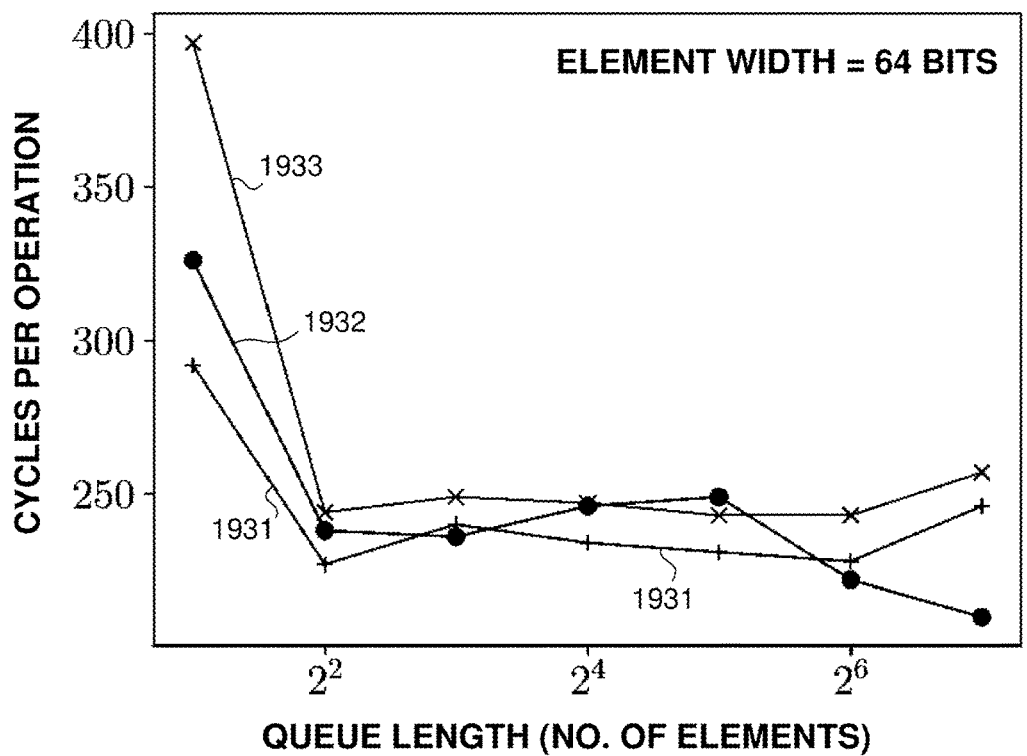
FIGS. 19A-19B are charts depicting exemplary clock cycles performance of the disclosed technologies, as a function of queue length.
Figure 19B:
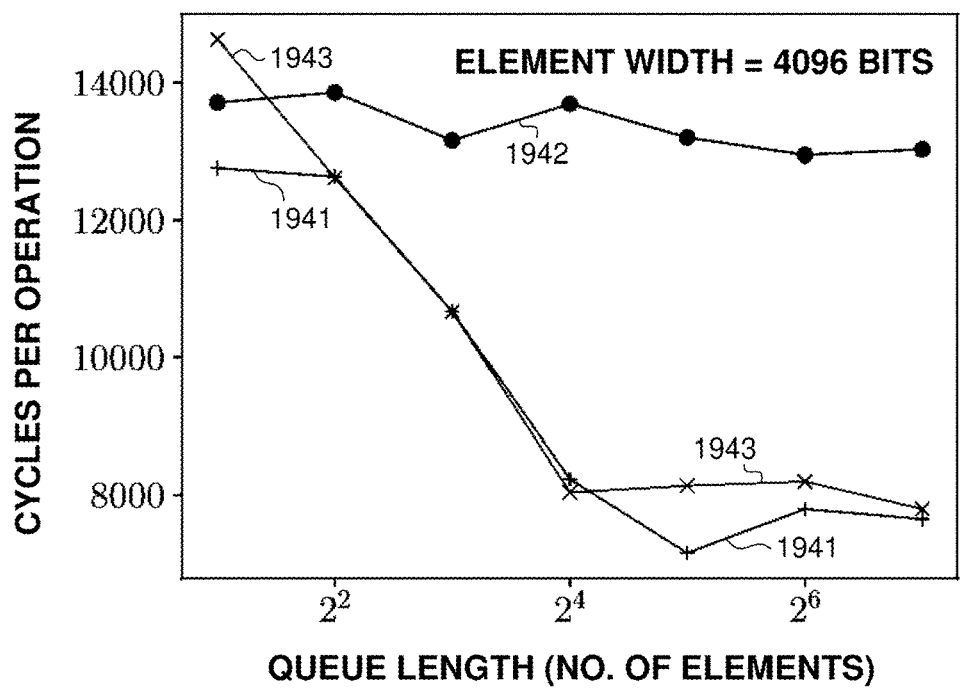

FIGS. 19A-19B are charts 1901-1902 depicting exemplary clock cycle performance of the disclosed technologies, as a function of queue length, from 2 elements to 128 elements. FIGS. 19A-19B show scaling and comparison for queue widths 64 bits and 4096 bits respectively. Graphs 1931, 1941 plot clock cycle requirements for queues managed using the disclosed technologies; graphs 1932, 1942 plot clock cycles for FastForward queues; and graphs 1933, 1943 plot clock cycles for Lamport+0 queues.

As in FIGS. 18A-18B, the innovative examples (1931, 1941) of FIGS. 19A-19B require fewer cycles than the comparative examples for short queues of length N=2. For longer queues, the innovative examples (1931, 1941) require about 10% fewer clock cycles than Lamport+0 queues (1933, 1943). For 64 bit wide queues, innovative examples (1931) vary in comparison with FastForward queues (1932). However, for wider queues, FastForward queues incur a significant penalty which can be attributed to writing and checking NULL entries for vacant queue elements.

4. Conclusion

For hard-wired implementations of queue management, the disclosed technologies provide good all-around performance for both area and delay. FastForward queues can suffer from greater delay, Lamport+1 queues can suffer from greater circuit area, and Lamport+0 queues can offer reduced capacity for a given queue length.

For software-based implementations of queue management, the disclosed technologies provide faster or comparable operation, measured in cycle counts, compared to both FastForward and Lamport+0 queues. Because the disclosed technologies are free from NULL-entry overhead and do not waste a queue element, the performance advantage of the disclosed technologies can, in some cases, be large.

A Generalized Computer Environment

Figure 20:
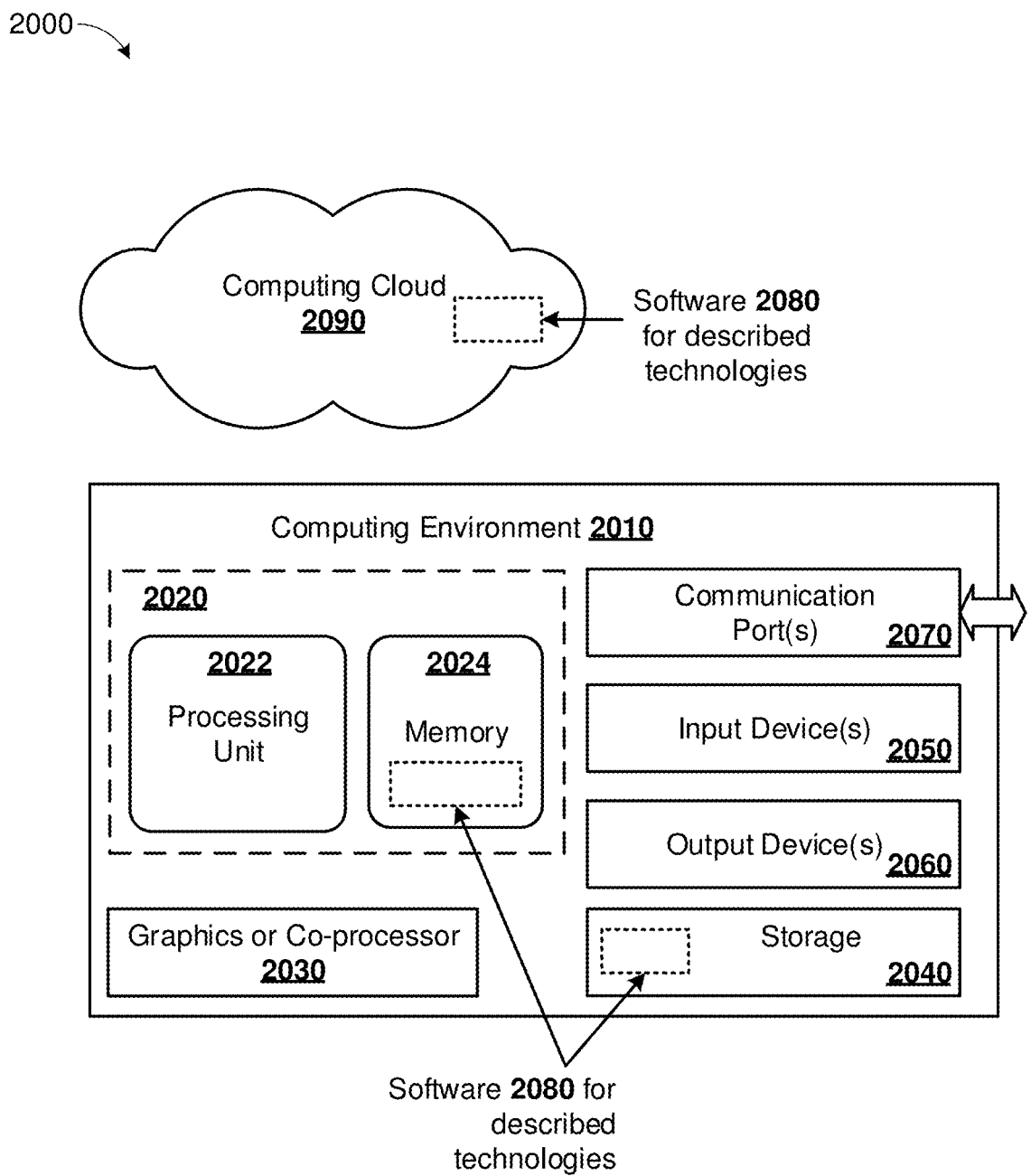
FIG. 20 illustrates a generalized example of a suitable computing environment in which described embodiments, techniques, and technologies pertaining to management of circular queues can be implemented.

FIG. 20 illustrates a generalized example of a suitable computing system 2000 in which some described examples, techniques, and technologies for queue management can be implemented. The computing system 2000 is not intended to suggest any limitation as to scope of use or functionality of the present disclosure, as the innovations can be implemented in diverse general-purpose or special-purpose computing systems. The computing system 2000 can control pointer controllers, enqueue logic, dequeue logic, and/or associated memory for storing pointers and queues; or can acquire, process, output, or store associated programs or data.

With reference to FIG. 20, computing environment 2010 includes one or more processing units 2022 and memory 2024. In FIG. 20, this basic configuration 2020 is included within a dashed line. Processing unit 2022 can execute computer-executable instructions, such as for control or data transfer as described herein. Processing unit 2022 can be a general-purpose central processing unit (CPU), a processor in an application-specific integrated circuit (ASIC), or any other type of processor. In a multi-processing system, multiple processing units execute computer-executable instructions to increase processing power. Computing environment 2010 can also include a graphics processing unit or co-processing unit 2030. Tangible memory 2024 can be volatile memory (e.g., registers, cache, or RAM), non-volatile memory (e.g., ROM, EEPROM, or flash memory), or some combination thereof, accessible by processing units 2022, 2030. The memory 2024 stores software 2080 implementing one or more innovations described herein, in the form of computer-executable instructions suitable for execution by the processing unit(s) 2022, 2030. The memory 2024 can also store pointers, queues, control parameters, configuration data, or operational data.

A computing system 2010 can have additional features, such as one or more of storage 2040, input devices 2050, output devices 2060, or communication ports 2070. An interconnection mechanism (not shown) such as a bus, controller, or network interconnects the components of the computing environment 2010. Typically, operating system software (not shown) provides an operating environment for other software executing in the computing environment 2010, and coordinates activities of the components of the computing environment 2010.

The tangible storage 2040 can be removable or non-removable, and includes magnetic disks, magnetic tapes or cassettes, CD-ROMs, DVDs, or any other medium which can be used to store information in a non-transitory way and which can be accessed within the computing environment 2010. The storage 2040 stores instructions of the software 2080 (including instructions and/or data) implementing one or more innovations described herein. Storage 2040 can also store image data, packet data, media frames, messages, task data, configuration data, or other databases or data structures described herein.

The input device(s) 2050 can be a mechanical, touch-sensing, or proximity-sensing input device such as a keyboard, mouse, pen, touchscreen, or trackball, a voice input device, a scanning device, or another device that provides input to the computing environment 2010. The output device(s) 2060 can be a display, printer, speaker, optical disk writer, or another device that provides output from the computing environment 2010. Input or output can also be communicated to/from a remote device over a network connection, via communication port(s) 2070.

The communication port(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 2000 can also include a computing cloud 2090 in which instructions implementing all or a portion of the disclosed technology are executed. Any combination of memory 2024, storage 2040, and computing cloud 2090 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system," "computing environment," and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein.

General Considerations

As used in this application, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "acquire," "advance," "apply," "buffer," "complement," "configure," "detect," "dequeue," "determine," "display," "distribute," "enqueue," "evaluate," "execute," "forward," "generate," "implement," "increment," "indicate," "interface," "manage," "match," "operate," "output," "perform," "process," "produce," "provide," "read," "receive," "retrieve," "select," "set," "store," "transfer," "transform," "update," and "use" to describe operations performed or controlled by a computer in a computer system. These terms can be high-level descriptions of the actual operations that are performed by a computer or, in other examples, by hard-wired circuitry. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smart phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 20, computer-readable storage media include memory 2024, and storage 2040. The terms computer-readable storage media or computer-readable media do not include signals and carrier waves. In addition, the terms computer-readable storage media or computer-readable media do not include communication ports (e.g., 2070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, Qt, R, Ruby, SAS, SPSS, SQL, WebAssembly, any derivatives thereof, or any other suitable programming language, or, in some examples, markup languages such as HTML or XML, or with any combination of suitable languages, libraries, and packages. Likewise, the disclosed technology is not limited to any particular computer or type of hardware. Hard-wired implementations can be implemented using electronic design automation (EDA) tools, with the aid of Verilog or VHDL languages. Certain details of suitable computers, hardware, or digital circuitry are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed subject matter may be applied, it should be recognized that the illustrated embodiments are only preferred examples of the disclosed subject matter and should not be taken as limiting the scope of the claims. Rather, the scope of the claimed subject matter is defined by the following claims. We therefore claim as our invention all that comes within the scope of these claims and their equivalents.

We claim:

1. A system for managing a lock free circular queue, wherein the queue has a predetermined number of elements and each element has a predetermined size, wherein the elements are indexed using respective element indexes and each element index is split into a respective pair of split indexes, and wherein a rear pointer of the queue is updated when an enqueue operation is performed, and a front pointer of the queue is updated when a dequeue operation is performed, the system comprising:
a rear-pointer controller configured to:
    determine whether a requested enqueue operation would fill the queue;
    if so, set the rear pointer to a given rear split index that indicates, in conjunction with a current value of the front pointer, that the queue is full; and
    otherwise, set the rear pointer to a default rear split index; and
a front-pointer controller configured to:
    evaluate whether a requested dequeue operation would empty the queue;
    if so, set the front pointer to a given front split index that indicates, in conjunction with a current value of the rear pointer, that the queue is empty; and
    otherwise, set the front pointer to a default front split index.

2. The system of claim 1, wherein the split indexes of any of the elements are denoted even and odd, the default rear split index is the odd split index of a second element of the queue following a first element of the queue targeted by the requested enqueue operation, and the default front split index is the even split index of a fourth element of the queue following a third element of the queue targeted by the requested dequeue operation.

3. The system of claim 1, wherein:
(i) the given rear split index is distinct from a split index of the current value of the front pointer, and the given front split index matches a split index of the current value of the rear pointer; or
(ii) the given rear split index matches the split index of the current value of the front pointer, and the given front split index is distinct from the split index of the current value of the rear pointer.

4. The system of claim 1, further comprising:
a data processing apparatus; and
memory storing instructions which, when executed by the data processing apparatus, cause the system to implement the rear-pointer controller and the front-pointer controller.

5. The system of claim 1, comprising:
first electronic circuitry hard-wired as the rear-pointer controller; and
second electronic circuitry hard-wired as the front-pointer controller.

6. The system of claim 1, further comprising:
a rear-pointer memory element, coupled to provide the current value of the rear pointer to the rear-pointer controller and to the front-pointer controller, and further coupled to receive an updated value of the rear pointer from the rear-pointer controller;
a demultiplexer configured to receive the current value of the rear pointer and to forward a data entry to an element of the queue designated by the current value of the rear pointer, in response to a write enable signal received from the rear-pointer controller;
a front-pointer memory element, coupled to provide the current value of the front pointer to the front-pointer controller and to the rear-pointer controller, and further coupled to receive an updated value of the front pointer from the front-pointer controller; and
a multiplexer configured to receive the current value of the front pointer and to forward a data entry from an element of the queue designated by the current value of the front pointer, in response to a read enable signal received from the front-pointer controller.

7. The system of claim 6, further comprising:
additional memory elements of the queue.

8. The system of claim 1, wherein the rear-pointer controller operates in an enqueue clock domain, the front-pointer controller operates in a dequeue clock domain, and the enqueue and dequeue clock domains are asynchronous relative to each other.

9. A central processing unit (CPU) module comprising the system of claim 1 and the queue, wherein the queue is an instruction buffer.

10. A network router or a network switch comprising the system of claim 1 and the queue, wherein the queue is a packet buffer.

11. A media streaming apparatus comprising the system of claim 1 and the queue, wherein the queue is a media stream buffer.

12. A load balancer comprising the system of claim 1 and configured to distribute a stream of tasks among a plurality of processors, descriptors of the tasks being stored in respective elements of the queue.

13. An integrated circuit comprising:
   the system of claim 1; and
   a port configured to interface with external memory providing the elements of the queue.

14. The integrated circuit of claim 13, wherein the integrated circuit is a packet processor and the enqueue operation and the dequeue operation transfer network data packets between the packet processor and the external memory.

15. The integrated circuit of claim 13, wherein the integrated circuit is a media processor and the enqueue operation and the dequeue operation transfer media frames between the media processor and the external memory.

16. The integrated circuit of claim 13, wherein the external memory comprises static random access memory (SRAM).

* * * * *